(12) United States Patent
Chiang et al.

(10) Patent No.: US 10,131,129 B2
(45) Date of Patent: Nov. 20, 2018

(54) STACK FILM ROLL AND STACK FILM SHEET OBTAINED THEREFROM

(71) Applicant: HENGHAO TECHNOLOGY CO., LTD., Hsinchu County (TW)

(72) Inventors: Chun-Lung Chiang, Taichung (TW); Masanori Yuki, Oamishirasato (JP); Ching-Fang Wong, Taichung (TW)

(73) Assignee: HENGHAO TECHNOLOGY CO., LTD., Hsinchu County (TW)

( * ) Notice: Subject to any disclaimer, the term of this patent is extended or adjusted under 35 U.S.C. 154(b) by 320 days.

(21) Appl. No.: 15/047,642

(22) Filed: Feb. 19, 2016

(65) Prior Publication Data
US 2016/0311211 A1 Oct. 27, 2016

(30) Foreign Application Priority Data
Apr. 22, 2015 (TW) .............................. 104112925 A

(51) Int. Cl.
| | |
|---|---|
| *B32B 38/10* | (2006.01) |
| *B32B 27/36* | (2006.01) |
| *B32B 7/12* | (2006.01) |
| *B32B 9/04* | (2006.01) |
| *B32B 15/08* | (2006.01) |
| *B32B 3/08* | (2006.01) |
| *B32B 27/08* | (2006.01) |
| *B32B 37/14* | (2006.01) |

(52) U.S. Cl.
CPC .............. *B32B 38/10* (2013.01); *B32B 3/085* (2013.01); *B32B 7/12* (2013.01); *B32B 9/045* (2013.01); *B32B 15/08* (2013.01); *B32B 27/08* (2013.01); *B32B 27/36* (2013.01); *B32B 37/144* (2013.01); *B32B 2250/44* (2013.01); *B32B 2307/202* (2013.01); *B32B 2307/412* (2013.01); *B32B 2307/546* (2013.01); *B32B 2307/732* (2013.01); *B32B 2367/00* (2013.01); *B32B 2457/208* (2013.01)

(58) Field of Classification Search
USPC ........................... 156/247, 278, 307.1, 307.3
See application file for complete search history.

(56) References Cited

U.S. PATENT DOCUMENTS 9,807,871 B2 * 10/2017 Theis .................... H05K 1/0266
9,831,487 B2 * 11/2017 Chung ................. H01M 4/0414
(Continued)

FOREIGN PATENT DOCUMENTS

| CN | 103250121 A | 8/2013 |
|---|---|---|
| CN | 103975295 A | 8/2014 |

(Continued)

*Primary Examiner* — Sing P Chan
(74) *Attorney, Agent, or Firm* — Winston Hsu

(57) ABSTRACT

A method for forming a touch film stack roll is provided. First, a stack roll is provided. The stack roll comprises a bottom substrate roll, a patterned bottom conductive layer, a bottom strip layer and a top conductive roll. The bottom strip layer covers the bottom conductive terminals of the patterned bottom conductive layer. Then, the top conductive roll is patterned to form a patterned top conductive layer with top conductive terminals. Next, a top strip layer is formed on the top conductive terminals. Later, a top OCA roll is attached to the stack roll to cover the top strip layer to obtain the touch film stack roll.

15 Claims, 47 Drawing Sheets

(56) References Cited

U.S. PATENT DOCUMENTS

| | | |
|---|---|---|
| 9,857,930 B2* | 1/2018 | Sebastian ................ G06F 3/044 |
| 9,864,241 B1* | 1/2018 | Pedder ................ G02F 1/13338 |
| 9,870,107 B2* | 1/2018 | Toyoshima ............. G06F 3/044 |
| 9,874,987 B2* | 1/2018 | Hashimoto ............. G06F 3/044 |
| 9,920,421 B2* | 3/2018 | Lotz ...................... C23C 14/562 |
| 9,927,893 B2* | 3/2018 | Hamada ................ G06F 3/0412 |
| 9,971,459 B2* | 5/2018 | Youngs ................... G06F 3/044 |
| 2002/0075556 A1* | 6/2002 | Liang ...................... G02F 1/167 |
| | | 359/296 |
| 2003/0007238 A1* | 1/2003 | Liang ...................... G02F 1/167 |
| | | 359/296 |
| 2003/0021005 A1* | 1/2003 | Liang ...................... G02F 1/167 |
| | | 359/296 |
| 2003/0043450 A1* | 3/2003 | Liang ...................... G02F 1/167 |
| | | 359/296 |
| 2003/0071794 A1* | 4/2003 | Arakawa ............... G06F 3/0488 |
| | | 345/173 |
| 2004/0187917 A1* | 9/2004 | Pichler .................... G02F 1/155 |
| | | 136/263 |
| 2005/0083307 A1* | 4/2005 | Aufderheide ........... G06F 3/044 |
| | | 345/173 |
| 2006/0056030 A1* | 3/2006 | Fukuda .................... G02B 1/11 |
| | | 359/586 |
| 2010/0220074 A1* | 9/2010 | Irvin, Jr. ................. G06F 3/045 |
| | | 345/174 |
| 2011/0099805 A1* | 5/2011 | Lee ........................ G06F 3/044 |
| | | 29/846 |
| 2012/0231245 A1 | 9/2012 | Kim |
| 2013/0168138 A1* | 7/2013 | Yamazaki ............... G06F 3/041 |
| | | 174/253 |
| 2014/0071357 A1* | 3/2014 | Kuo ...................... G06F 1/1643 |
| | | 349/12 |
| 2014/0092325 A1* | 4/2014 | Chen ..................... G06F 1/1692 |
| | | 349/12 |
| 2014/0104228 A1 | 4/2014 | Chen |
| 2014/0218053 A1* | 8/2014 | Ullmann ................. G06F 3/044 |
| | | 324/658 |
| 2015/0010695 A1* | 1/2015 | Poon .................... H05K 1/0296 |
| | | 427/97.4 |
| 2015/0014025 A1* | 1/2015 | Poon .................... H05K 1/0274 |
| | | 174/253 |
| 2015/0029143 A1* | 1/2015 | Kang ..................... G06F 1/1652 |
| | | 345/174 |
| 2015/0033968 A1* | 2/2015 | Derichs ................. B41F 27/005 |
| | | 101/481 |
| 2015/0109234 A1* | 4/2015 | Lotz .................... C23C 14/5873 |
| | | 345/174 |
| 2015/0140287 A1* | 5/2015 | Poon ........................ H01B 1/02 |
| | | 428/195.1 |
| 2015/0220183 A1* | 8/2015 | Youngs ................... G06F 3/044 |
| | | 345/173 |
| 2015/0316955 A1* | 11/2015 | Dodds ..................... G06F 3/041 |
| | | 345/173 |
| 2016/0060468 A1* | 3/2016 | Kim ........................ C09D 5/24 |
| | | 428/323 |
| 2016/0303838 A1* | 10/2016 | Chen ....................... G06F 3/041 |

FOREIGN PATENT DOCUMENTS

| | | |
|---|---|---|
| CN | 104571660 A | 4/2015 |
| TW | 200709430 | 3/2007 |
| TW | 201248254 A1 | 12/2012 |
| TW | I445797 B | 7/2014 |
| WO | 2014/132623 A1 | 9/2014 |
| WO | 2014/178541 A1 | 11/2014 |

* cited by examiner

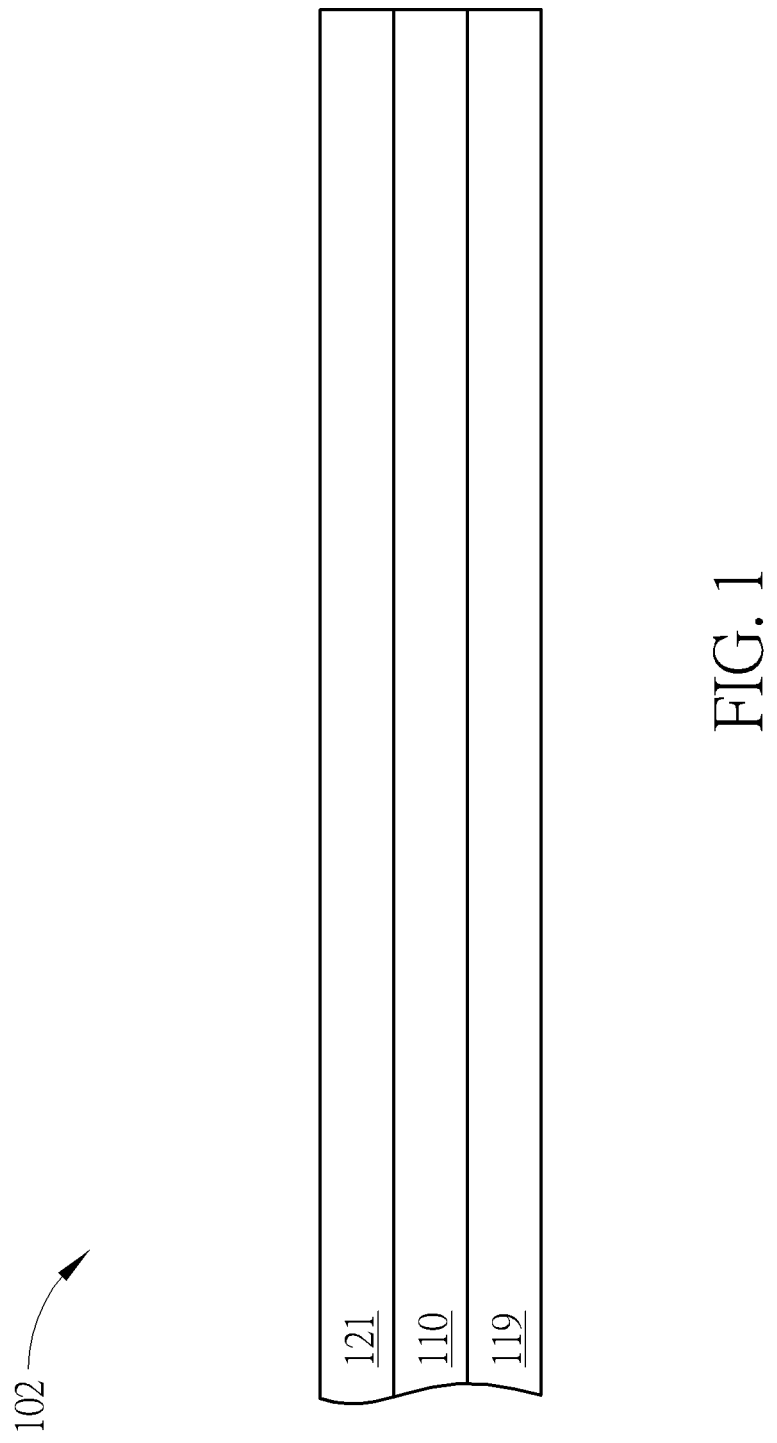

STACK FILM ROLL AND STACK FILM SHEET OBTAINED THEREFROM

BACKGROUND OF THE INVENTION

1. Field of the Invention

The present invention generally relates to a method of manufacturing a touch film stack roll and an obtained touch film stack sheet therefrom. More particularly, the present invention is directed to a method of manufacturing a touch film stack and a touch film stack sheet obtained from it by a roll-to-roll adhesion production with the help of the introduction of a strip layer.

2. Description of the Prior Art

Different layers in the form of respective pre-sheets which undergo a patterning step to define conductive lines are used in the conventional method to manufacture a thin film for a touch panel. After completion, the optically clear adhesive (OCA) are used to adhere different layer sheets to one another. Before the adhering procedure, a cutting procedure has to be performed on each material layer which is disposed on each conductive terminal which blocks each conductive terminal to cut the above blocking layers off to adhere each layer sheet together.

Although the technique has been used for years and the process is well-developed, the process has a misalignment up to 0.1 mm because this process requires difficultly high accuracy to use batch production to carry out a sheet-to-sheet adhesion. Meanwhile, roll materials of each layer have to go through multiple cutting steps to provide the material sheets in advance so a continuous process cannot be used and it results in low productivity and low yield.

SUMMARY OF THE INVENTION

To overcome the prior art's shortcomings, this invention proposes a novel method to manufacture a touch film stack roll and a touch film stack sheet therefrom. This invention adopts the method of continuous roll-to-roll adhering production to manufacture the touch film stack roll. After the touch film stack roll is completed, steps of partially cutting through and of partially not cutting through are carried out on the same surface. Because of the continuous roll-to-roll adhering production, a problem of unnecessary alignment steps between upper and lower conductive layers or a production problem of roll materials of each layer which have to undergo multiple cutting steps can be greatly eliminated.

The invention in a first aspect provides a method of manufacturing a touch film stack roll. First, a composite layer roll is provided. The composite layer roll comprises a bottom substrate roll, a bottom conductive layer and a bottom strip layer. The bottom strip layer covers the bottom conductive terminals of the bottom conductive layer. Second, a top material layer roll is adhered to the bottom conductive layer of the composite layer roll. The top material layer roll covers the bottom strip layer at the same time. The top material layer roll comprises at least a top conductive layer. After that, the top conductive layer of the top material layer roll is patterned to be a patterned top conductive layer. Then, a top strip layer is formed on the patterned top conductive terminals of the top material layer roll and simultaneously covers the top conductive terminals of the top conductive layer. Next, a top optically clear adhesive is as a whole adhered to the patterned top conductive layer of the top material layer roll, to cover the top strip layer, and to obtain the touch film stack roll.

In one embodiment of this invention, the method of manufacturing a touch film stack roll further comprises the following steps. First, a pre-composite layer roll including a bottom substrate and a bottom conductive layer is provided. Subsequently, the entire the bottom conductive layer of the pre-composite layer roll is patterned to form a patterned bottom conductive layer. After that, a bottom strip layer liquid is applied onto the patterned bottom conductive layer of the pre-composite layer roll to cover the bottom conductive terminals of the patterned bottom conductive layer. Then, the bottom strip layer liquid is cured to form a roll of the composite layer roll.

In another embodiment of this invention, the method of manufacturing a touch film stack roll further comprises the following step. A top conductive layer is adhered onto a bottom optically clear adhesive to form the top material layer roll.

In another embodiment of this invention, the method of manufacturing a touch film stack roll further comprises the following steps. A bottom optically clear adhesive is adhered onto the composite layer roll. Subsequently, the top material layer roll is adhered to the composite layer roll by the bottom optically clear adhesive.

In another embodiment of this invention, the top conductive layer is patterned by block-type exposing the top material layer roll that aligns with the bottom conductive layer.

In another embodiment of this invention, there is substantially no misalignment between the bottom conductive layer and the patterned top conductive layer.

In another embodiment of the invention, the method of forming the top strip layer onto the patterned top conductive layer of the top material layer roll further comprises the following steps. First, a top strip layer liquid is applied onto the patterned top conductive layer. After that, top strip layer liquid is cured to form the top strip layer.

In another embodiment of this invention, the method of manufacturing a touch film stack roll further comprises the following steps. First, the touch film stack roll is cut from a first surface of the touch film stack roll. The touch film stack roll is not cut through when cutting the touch film stack roll from the first surface. Subsequently, the touch film stack roll is cut from a second surface of the touch film stack roll to form a semi-finished touch film stack. The touch film stack roll is partially cut through and partially not cut through when cutting the touch film stack roll from the second surface of the touch film stack roll.

In another embodiment of this invention, the semi-finished touch film stack comprises a first strip stack layer and a second strip stack layer which are formed by cutting the touch film stack roll from the first surface and the second surface.

In another embodiment of the invention, the method of manufacturing a touch film stack roll further comprises the following steps. The first strip stack layer and the second strip stack layer are removed from the second surface to expose the first conductive terminals and the second conductive terminals.

In another embodiment of this invention, the residue of at least one of the bottom strip layer and the top strip layer remains after the first strip stack layer and the second strip stack layer are removed.

In another embodiment of this invention, the first strip stack layer and the second strip stack layer are removed simultaneously.

In another embodiment of this invention, the first strip stack layer and the second strip stack layer are successively removed.

In another embodiment of this invention, the first conductive terminals are electrically connected to the bottom conductive layer, and the second conductive terminals are electrically connected to the top conductive layer.

In another embodiment of this invention, the method of manufacturing a touch film stack roll further comprises the following step. The first strip stack layer and the second strip stack layer are removed to obtain the touch film stack sheet.

Another aspect of this invention is to provide a touch film stack sheet. The touch film stack sheet is obtained by the aforesaid manufacturing method and comprises at least one of the bottom strip layer and the top strip layer.

Another aspect of this invention is to provide a touch film stack sheet. The touch film stack sheet is obtained by the aforesaid manufacturing method and comprises a cut mark from partially cutting the touch film stack sheet.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. In the drawings:

FIG. 1A to FIG. 4A, FIG. 10A to FIG. 17A are schematic plan views of the fabrication method of the touch film stack roll according to the present invention.

FIG. 1B is a schematic, cross-sectional diagram taken along line II-II' of FIG. 1A;

FIG. 2 is a schematic, cross-sectional diagram taken along line I-I' of FIG. 2A;

FIG. 3 is a schematic, cross-sectional diagram taken along line I-I' of FIG. 3A;

FIG. 4 is a schematic, cross-sectional diagram taken along line I-I' of FIG. 4A;

FIG. 10 is a schematic, cross-sectional diagram taken along line I-I' of FIG. 10A;

FIG. 11 is a schematic, cross-sectional diagram taken along line I-I' of FIG. 11A;

FIG. 12 is a schematic, cross-sectional diagram taken along line I-I' of FIG. 12A;

FIG. 13 is a schematic, cross-sectional diagram taken along line I-I' of FIG. 13A;

FIG. 14 is a schematic, cross-sectional diagram taken along line I-I' of FIG. 14A;

FIG. 15 is a schematic, cross-sectional diagram taken along line I-I' of FIG. 15A;

FIG. 16 is a schematic, cross-sectional diagram taken along line I-I' of FIG. 16A;

FIG. 17 is a schematic, cross-sectional diagram taken along line I-I' of FIG. 17A;

DETAILED DESCRIPTION

The present invention provides a method of manufacturing a touch film stack roll and a touch film stack sheet. This invention adopts the method of continuous roll-to-roll adhering production to manufacture the touch film stack roll. After the touch film stack roll is completed, steps of partially cutting through and of partially not cutting through are respectively carried out on different sides. Because of the continuous roll-to-roll adhering production, the alignment problems of the upper and lower conductive layers, and the productivity problems arising from the multiple cutting steps of the roll material of each layer can be greatly eliminated.

In another aspect of the invention, an easily-strippable strip layer is applied on the conductive terminals of the touch film stack roll. After all the adhesion process is completed, steps of partially cut through and partially not cut through the touch film stack are respectively carried out. Advantageously, because of the easily-strippable feature of the strip layer, the strip stack layer atop the conductive terminal can be easily removed by simple operation to exposure the underlying conductive terminals for the electrical connecting to the flexible printed circuit (FPC) board in later process.

The present invention in a first aspect provides a method of fabricating a touch film stack roll. FIG. 1A to FIG. 4A and FIG. 10A to FIG. 17A illustrate a top view of the fabrication method of the touch film stack roll according to the present invention. FIG. 1 to FIG. 4 and FIG. 10 to FIG. 17 illustrate the cross-section along a first direction, e.g., I-I', of FIG. 1A to FIG. 4A. and FIG. 10A to FIG. 17A accordingly. FIG. 5 to FIG. 9 illustrates the variations according to FIG. 4. FIG. 1B to FIG. 4B and FIG. 10B to FIG. 17B illustrate the cross-section along a second direction, e.g., II-II', of FIG. 1A to FIG. 4A and FIG. 10A to FIG. 17A accordingly.

Figure 4:
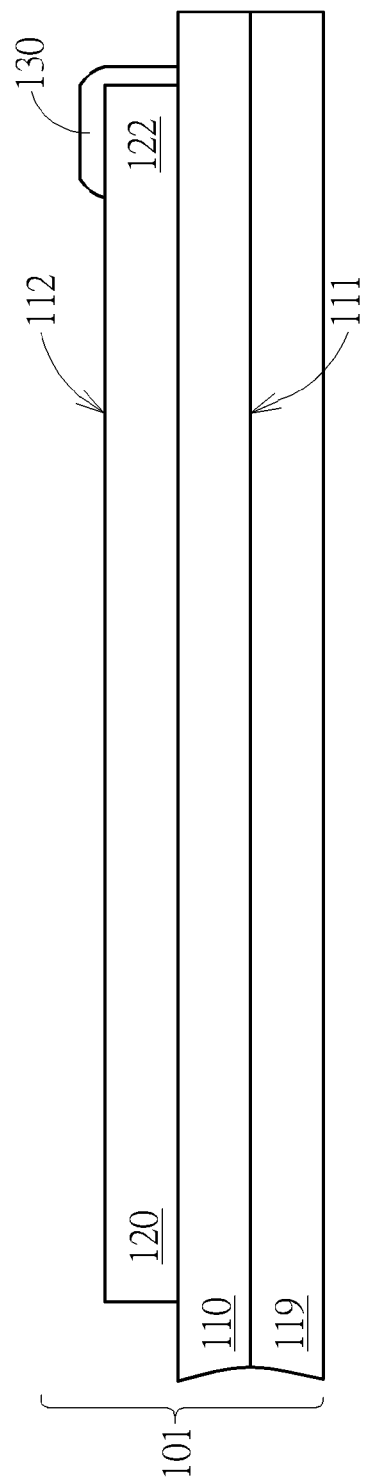
Figure 4A:
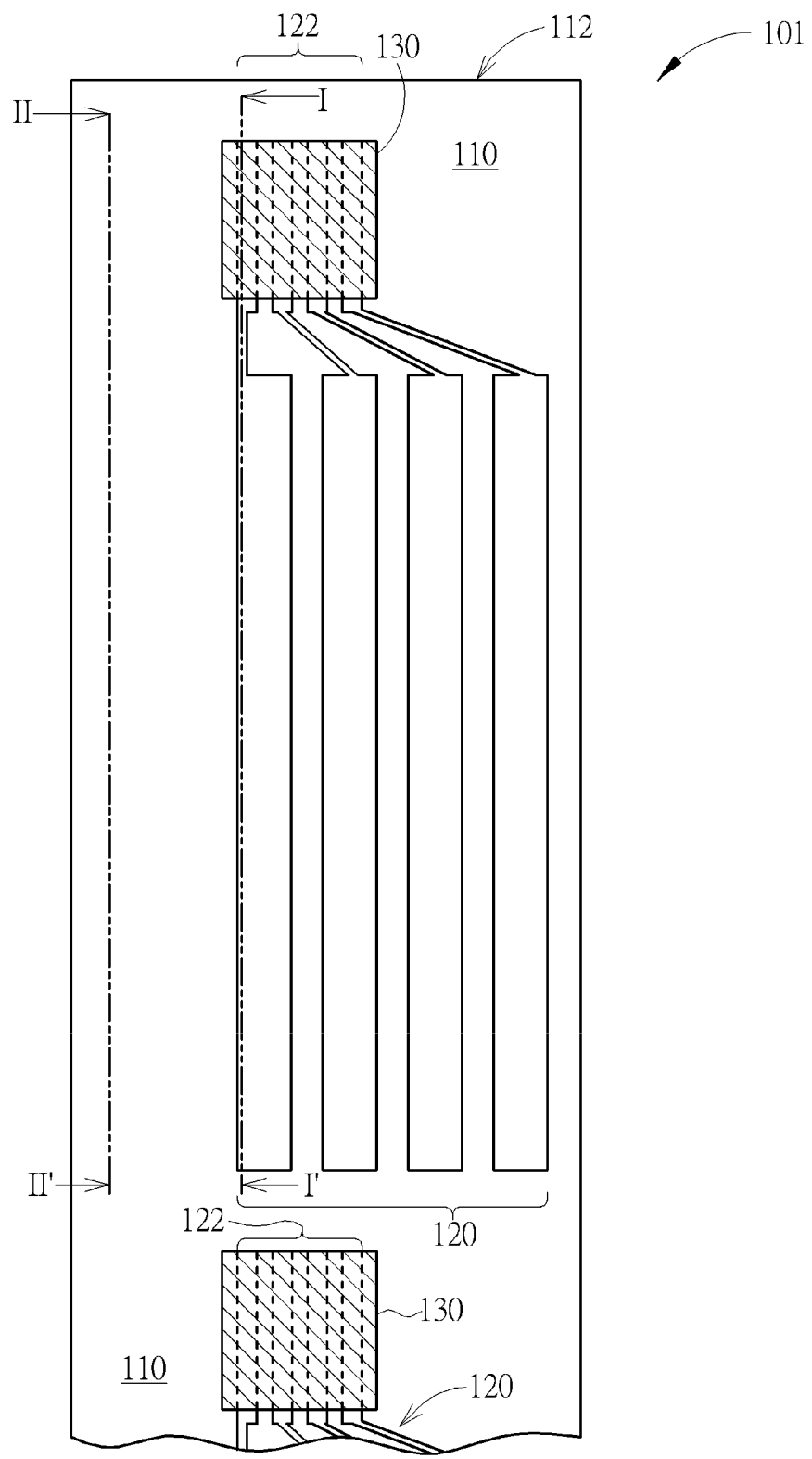
Figure 4B:
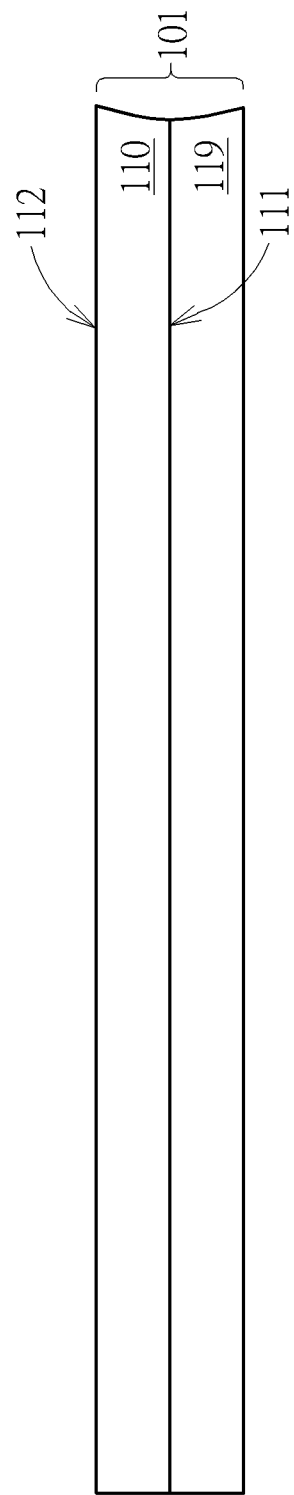
FIG. 4B is a schematic, cross-sectional diagram taken along line II-II' of FIG. 4A.

First, as shown in FIG. 4, FIG. 4A and FIG. 4B, a whole roll of a composite layer roll 101 is provided. The composite layer roll 101 comprises a whole roll of a bottom substrate 110, a patterned bottom conductive layer 120 and a bottom strip layer 130. The patterned bottom conductive layer 120 is on the second surface 112 of the bottom substrate 110 and has bottom conductive terminals 122 at the end. The bottom terminals 122 electrically connect to the patterned bottom conductive layer 120. A bottom strip layer 130 is on the second surface 112 of the bottom substrate 110 and covers the bottom conductive terminals 122 of the patterned bottom conductive layer 120.

The bottom substrate 110 may be previously rolled-up entirely into a whole roll, and may extend in a single direction. The bottom substrate 110 may comprise a light transmitting plastic material such as polyethylene terephthalate (PET), and have an appropriate thickness ranging from 25 to 100 μm. The patterned bottom conductive layer 120 is adhered tightly to the second surface 112 of the bottom substrate 110. The patterned bottom conductive layer 120 may comprise a light transmitting conductive material such as indium tin oxide (ITO), indium zinc oxide (IZO), grating metal strip, sliver film or the combination thereof, and may have an appropriate thickness ranging from 5 to 20 nm. The bottom strip layer 130 may comprise a flexible plastic film such as cured polyvinyl chloride (PVC) film, and may have an appropriate thickness ranging from 25 to 100 μm. As shown in FIG. 4, the patterned bottom conductive layer 120 and the bottom strip layer 130 may be on the composite layer roll 101 together in the form of a dis-continuous block pattern. Optionally, the bottom substrate 110 may be disposed on a carrier 119. The carrier 119 may comprise a light transmitting plastic material such as polyethylene terephthalate (PET). The carrier 119 is on the first surface 111 of the bottom substrate 110 and may be thicker than the bottom substrate 110. The carrier 119 may have an appropriate thickness ranging from 110 to 150 μm.

Figure 1A:
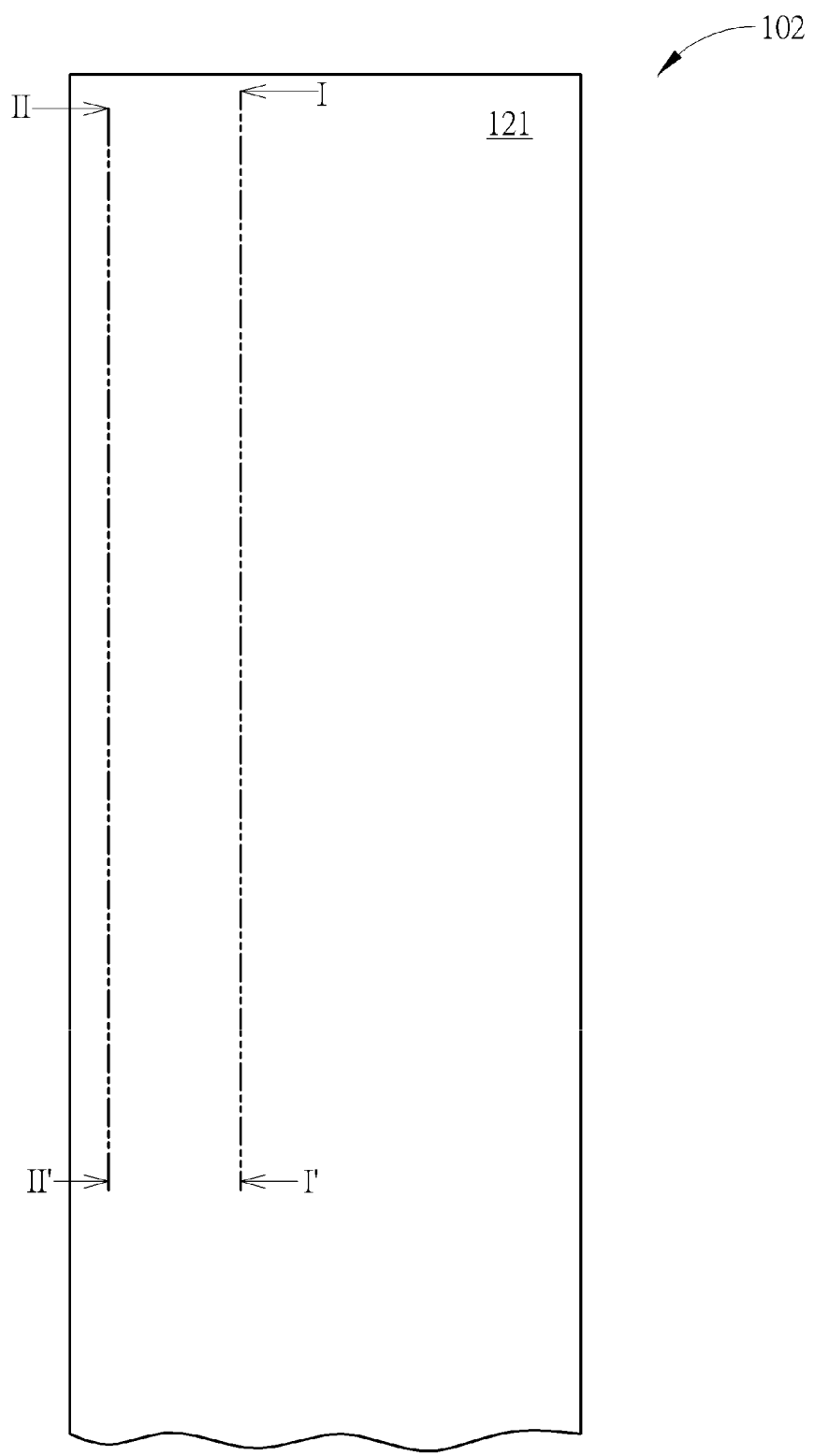
Figure 1B:
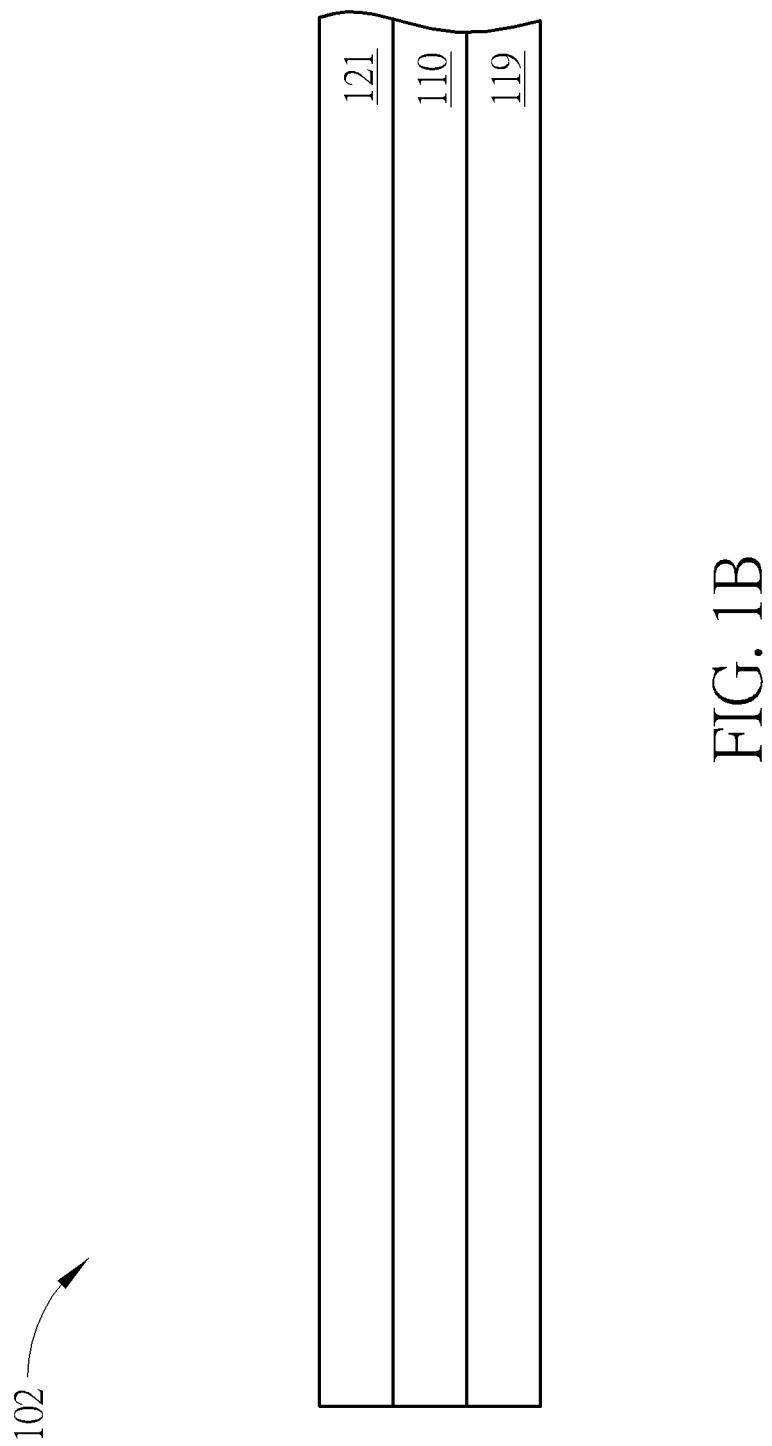
FIG. 1B is a schematic, cross-sectional diagram taken along line I-I' of FIG. 1A.
Figure 2:
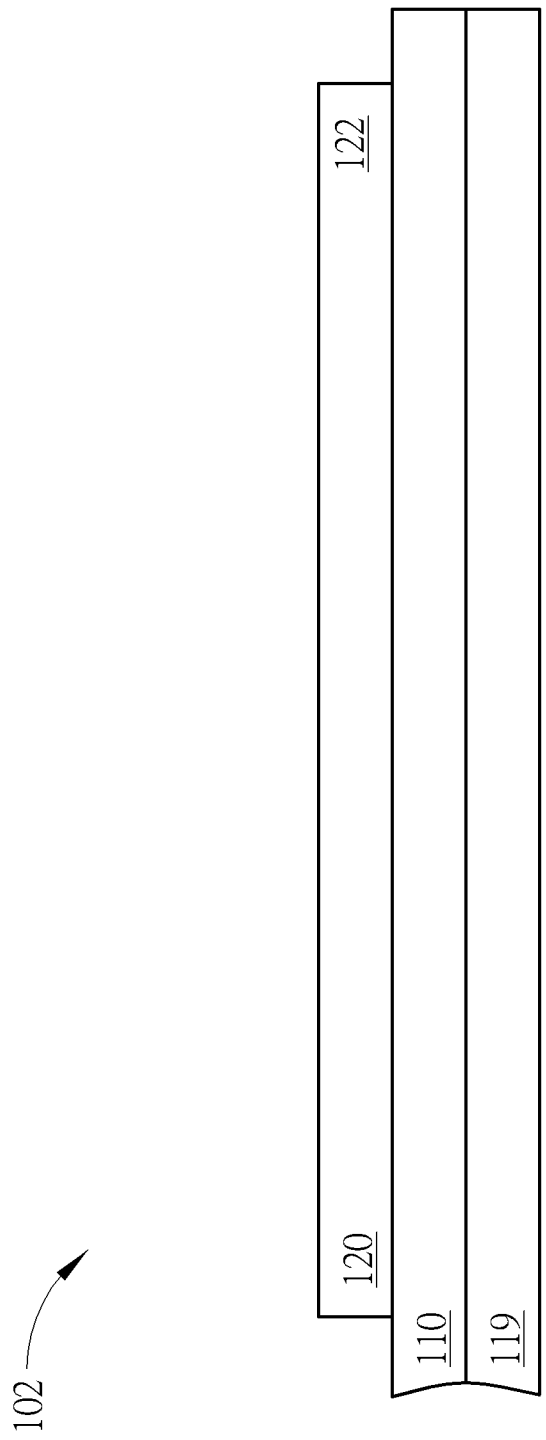
Figure 2A:
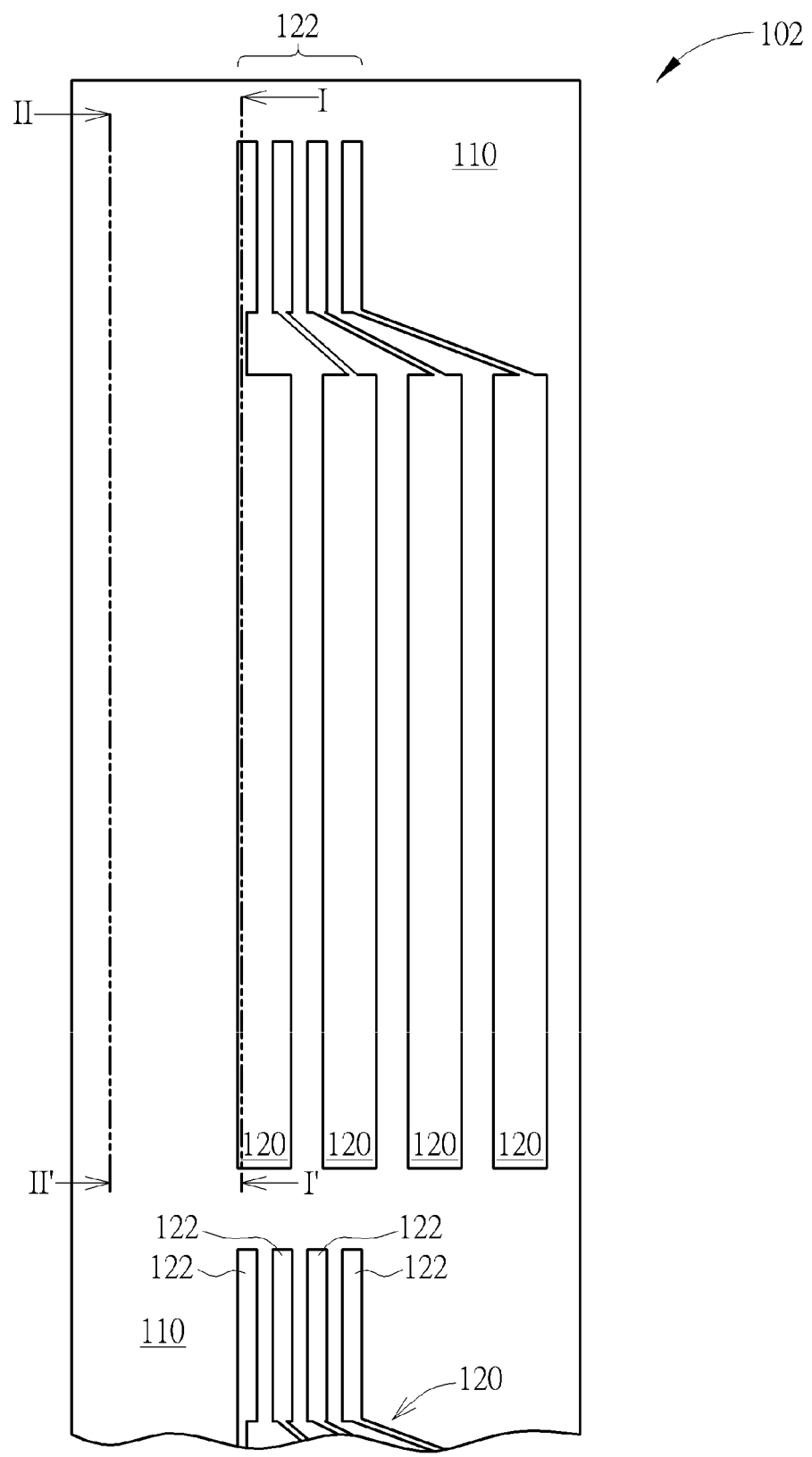
Figure 2B:
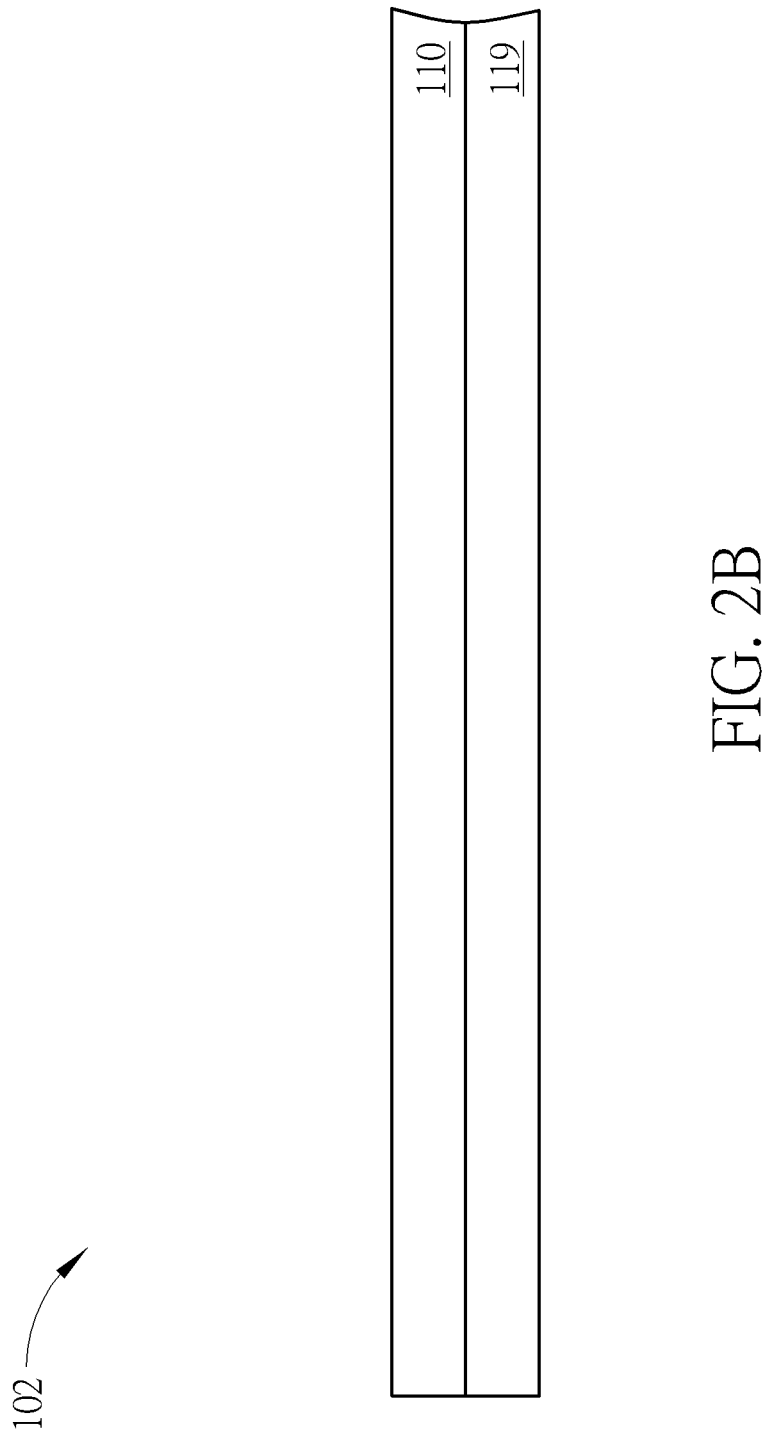
FIG. 2B is a schematic, cross-sectional diagram taken along line II-II' of FIG. 2A.

A prepared pre-composite layer roll 102 may be used to make the whole roll of the composite layer roll 101. As shown in FIG. 1, FIG. 1A and FIG. 1B, a whole roll of the pre-composite layer roll 102 comprising a bottom substrate 110, an un-patterned bottom conductive layer 121 and an optional carrier 119 is provided. Subsequently, as shown in FIG. 2, FIG. 2A and FIG. 2B, the un-patterned bottom conductive layer 121 is patterned to form the patterned bottom conductive layer 120. The bottom conductive terminals 112 are also formed at the end of the patterned bottom conductive layer 120 during the patterning process. A wet etching process may be used to etch the un-patterned bottom conductive layer 121 to obtain the patterned bottom conductive layer 120.

Figure 3:
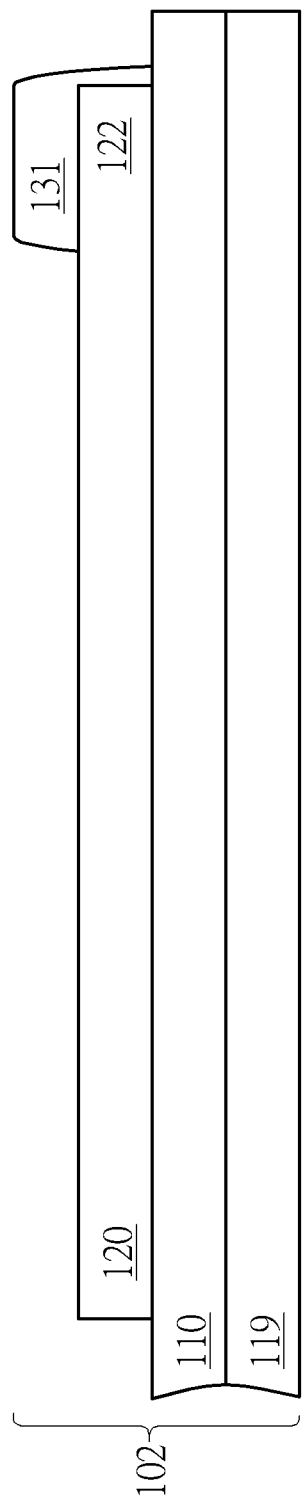
Figure 3A:
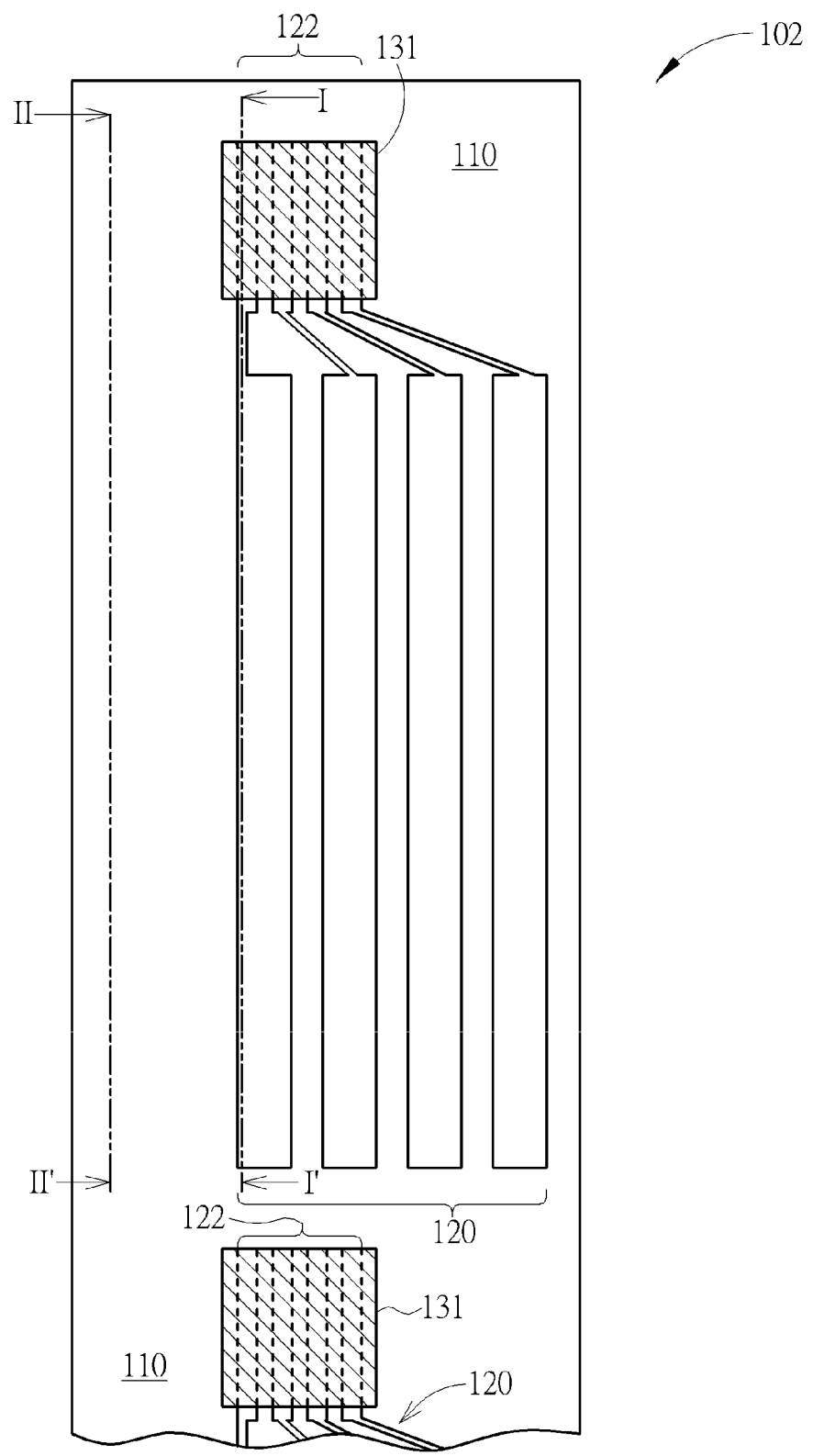
Figure 3B:
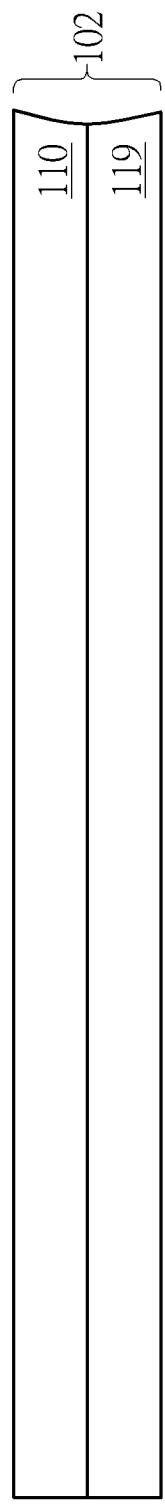
FIG. 3B is a schematic, cross-sectional diagram taken along line II-II' of FIG. 3A.

After that, as shown in FIG. 3, FIG. 3A and FIG. 3B, a bottom strip layer liquid 131 is applied onto the patterned bottom conductive layer 120 of the pre-composite layer roll 102, especially covering the bottom conductive terminals 122. The bottom strip layer liquid 131 may comprise adhesive polyvinyl chloride (PVC) liquid glue and may be applied onto the pre-composite layer roll 102 by printing technique. Subsequently, as shown in FIG. 4, FIG. 4A and FIG. 4B, the adhesive bottom strip layer liquid 131 is cured to obtain the whole roll of the composite layer roll 101. The method to cure the bottom strip layer liquid 131 may comprise bake it at a temperature between 50° C. to 200° C. for around 10~30 minutes. The bottom strip layer liquid 131 may shrink and loss its viscosity after the curing process, and become the bottom strip layer 130 which only adheres on the bottom conductive terminals 122.

After the patterned bottom conductive layer 120 and the bottom strip layer 130 are formed, a top conductive layer 161 is adhered to the whole roll of the composite layer roll 101. There is more than one procedure to adhere the top conductive layer 161 to the composite layer roll 101. FIG. 5 to FIG. 9 are the examples of the possible variations of the adhering procedure.

Figure 5:
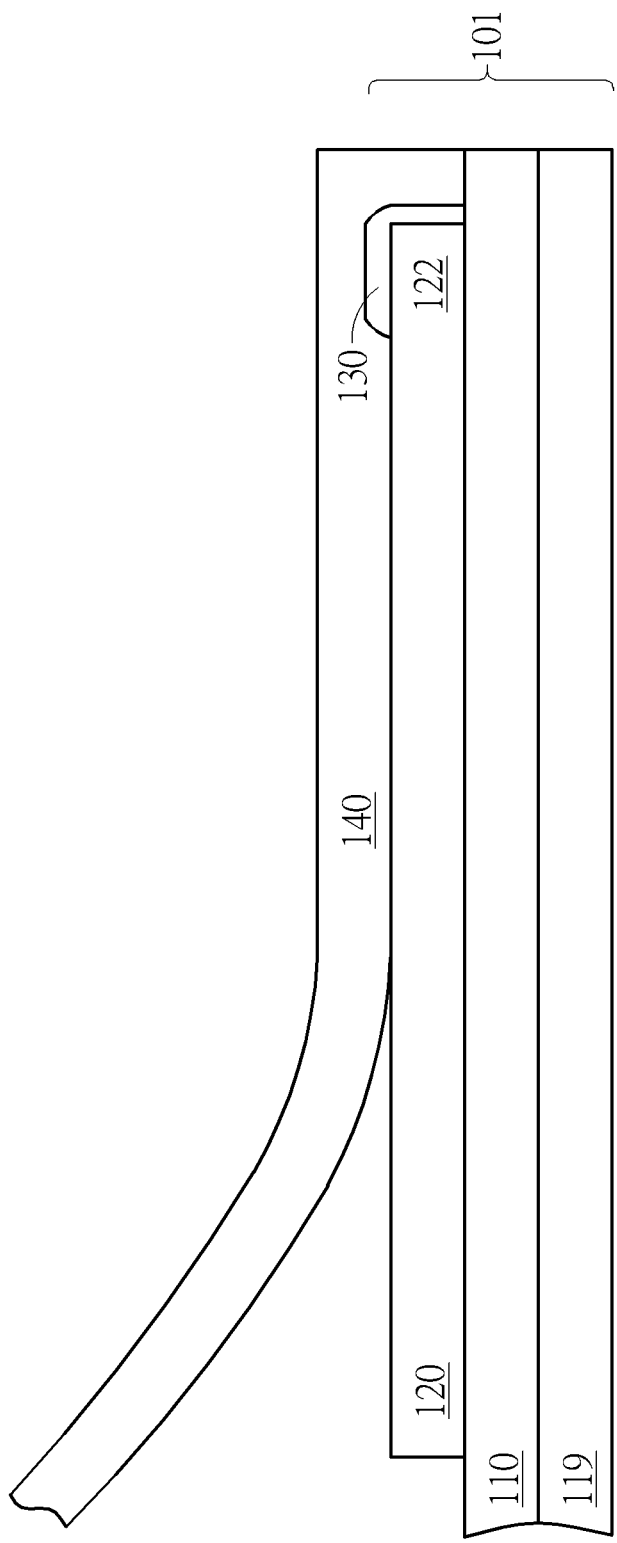
FIG. 5 to FIG. 9 are cross-sectional diagrams illustrate the additional variety of FIG. 4.
Figure 6:
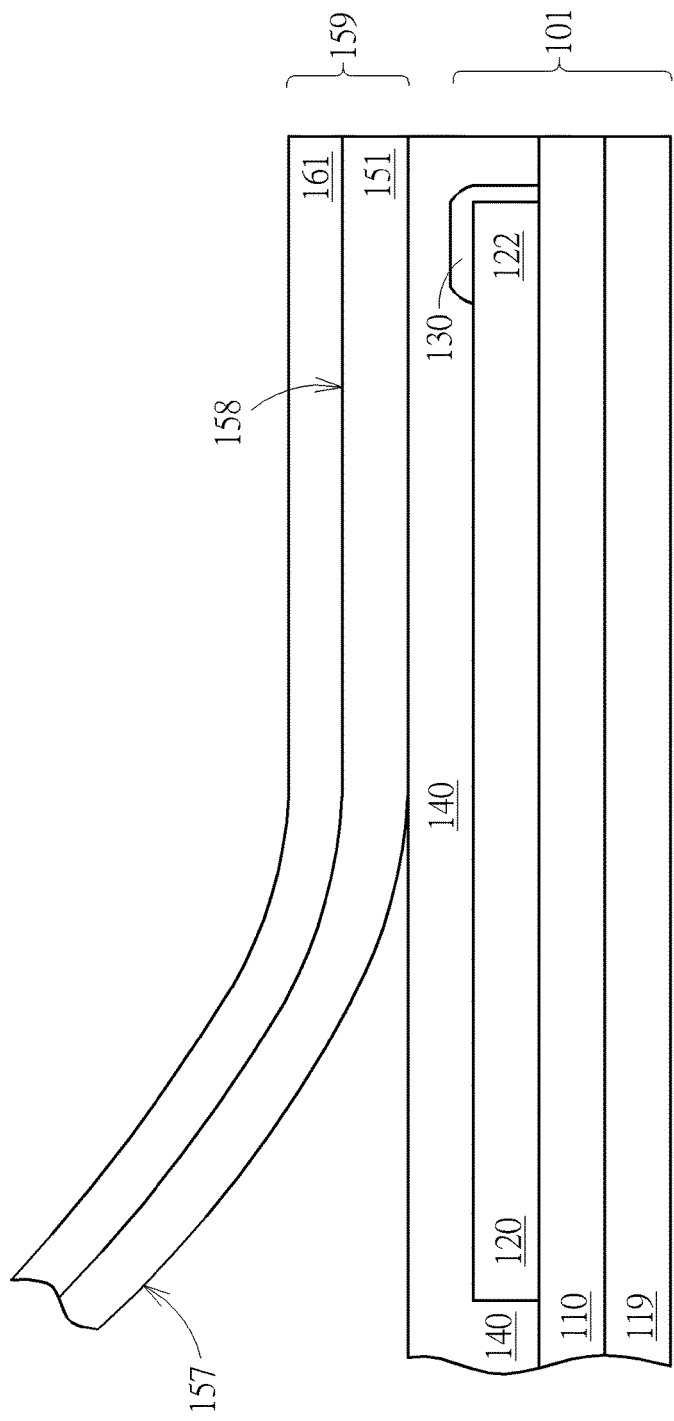

Please refer to FIG. 5 and FIG. 6, showing an exemplary embodiment of the adhering procedure. As shown in FIG. 5, a whole roll of a bottom optically clear adhesive 140 is adhered to the whole roll of the composite layer roll 101. The process may be carried out in a roll to roll adhering production mold, for example, by a press molding machine. After that, as shown in FIG. 6, a whole roll of a prepared top material layer roll 159, through its first surface which is opposite to its second surface, is directly adhered to the bottom optically clear adhesive 140 of the whole roll of the composite layer roll 101 by the adhesive property of the bottom optically clear adhesive 140. The top material layer roll 159 is thereby indirectly adhered to the patterned bottom conductive layer 120 and covers the bottom strip layer 130 by the adhering process.

Figure 7:
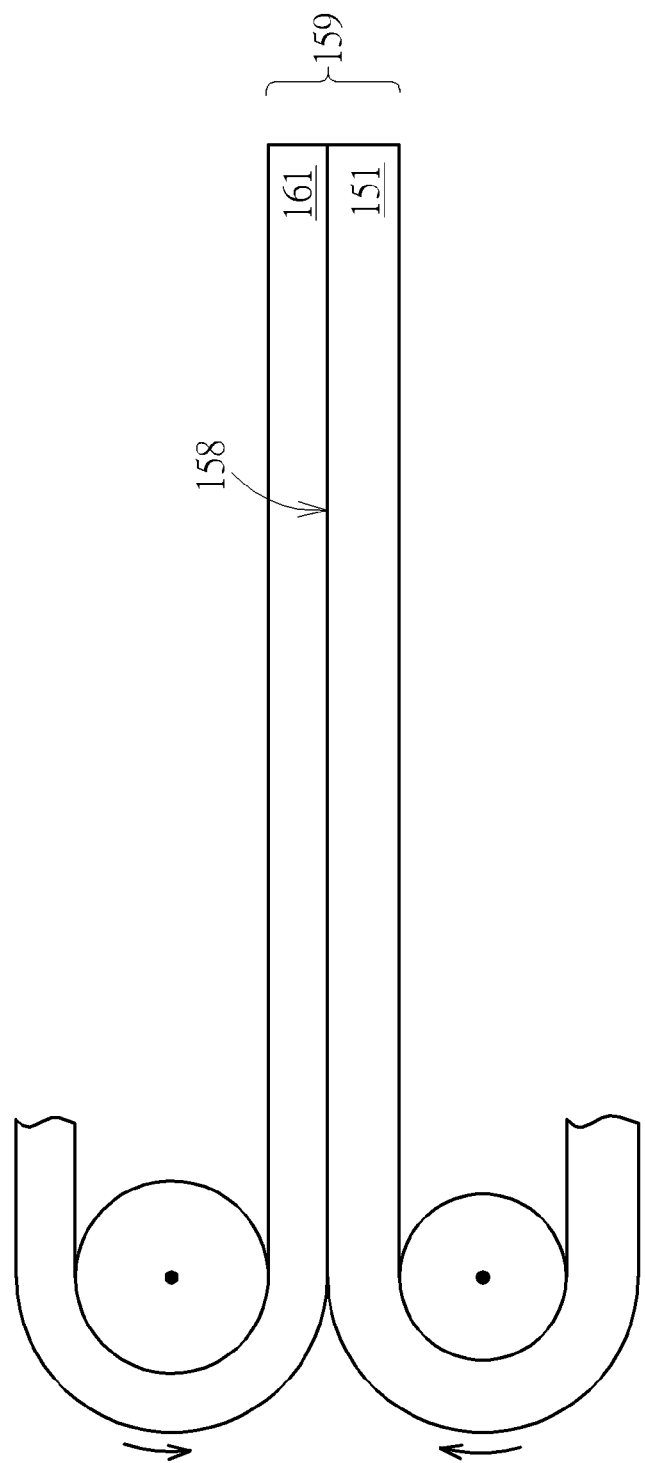

In this embodiment, the whole roll of the prepared pre-composite layer roll 159 may comprise a top substrate 151 and a top conductive layer 161 similar to the bottom substrate 110 and bottom conductive layer 120. For example, as shown in FIG. 7, the top material layer roll 159 is obtained after the whole roll of the top conductive layer 161 is adhered to the whole roll of the top substrate 151. The top substrate 151 may be previously rolled-up entirely into a whole roll, and may extend in a single direction. The top substrate 151 may comprise a light transmitting plastic material such as polyethylene terephthalate (PET), and may have an appropriate thickness ranging from 25 to 100 μm. The whole roll of the top conductive layer 161 is adhered tightly on the second surface 158 of the whole roll of the top substrate 151. The top conductive layer 161 may comprise a light transmitting conductive material such as indium tin oxide (ITO), indium zinc oxide (IZO), grating metal strip, sliver film or the combination thereof. The top conductive layer 161 may have a proper thickness ranging from 5 to 20 nm.

Figure 8:
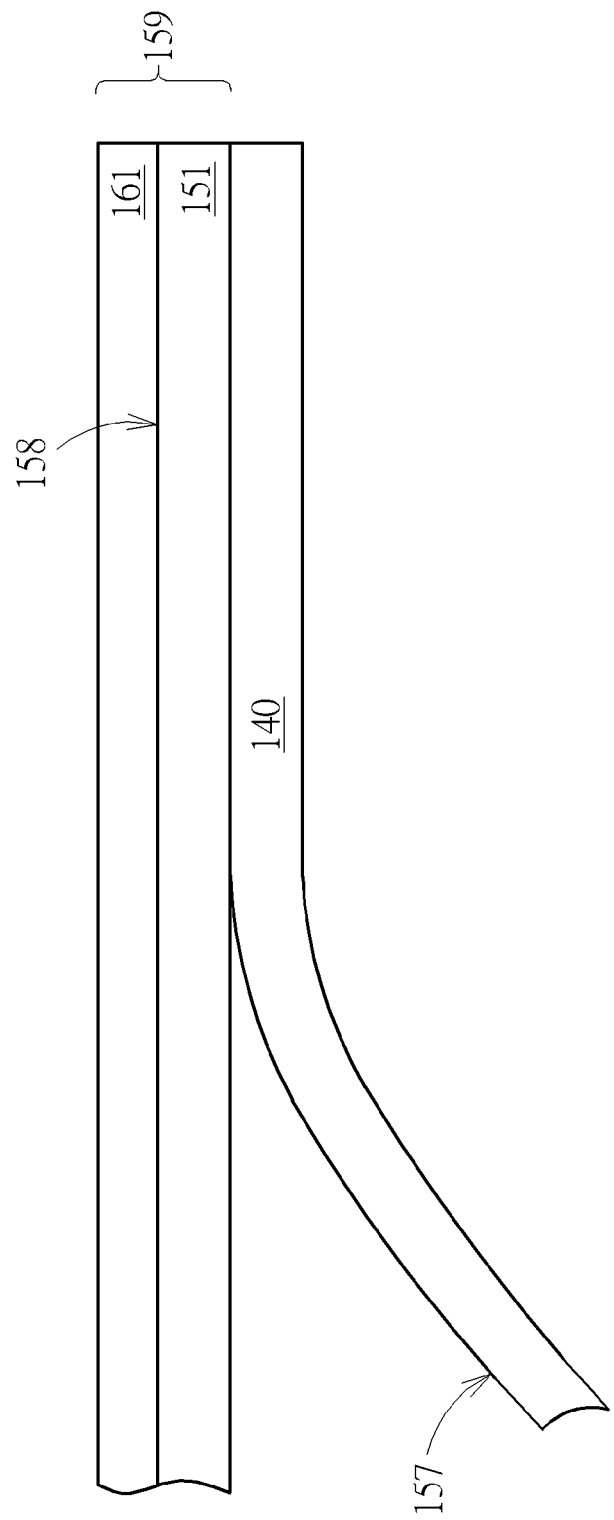
Figure 9:
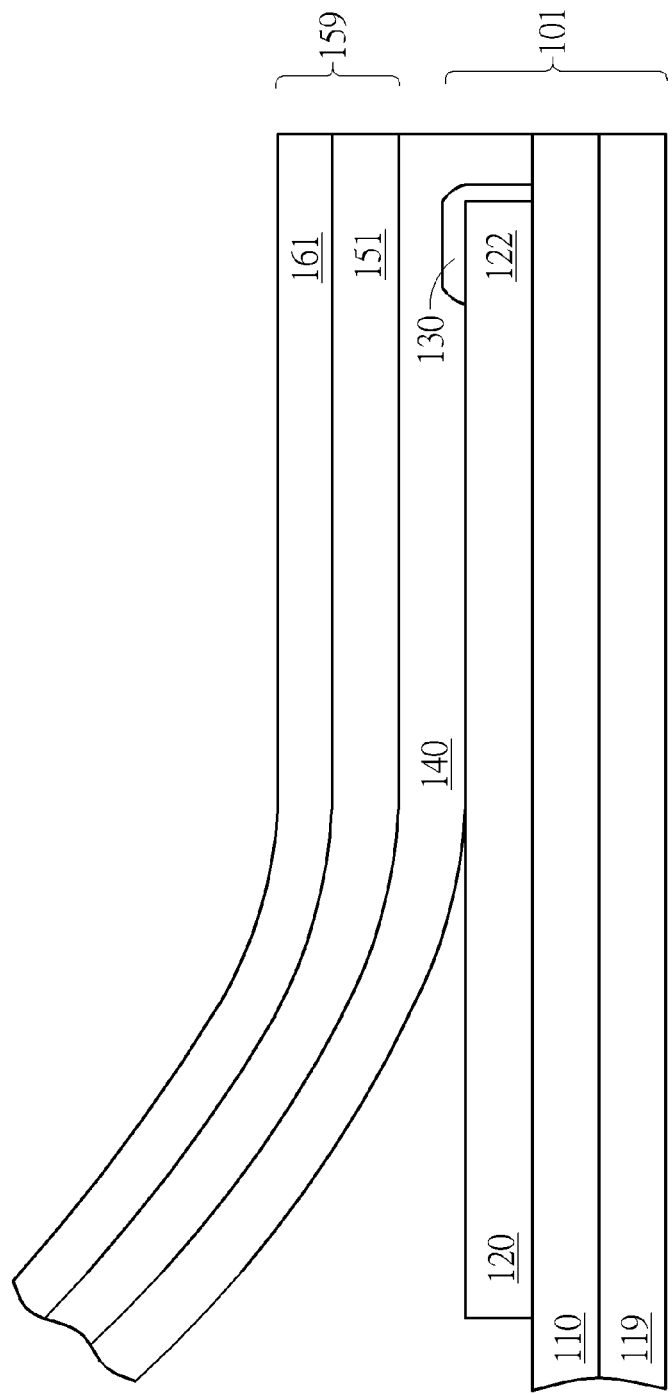

Please refer to FIG. 8 and FIG. 9, showing another exemplary embodiment of the adhering process. The difference is that the whole roll of the bottom optically clear adhesive 140 is adhered to the first surface 157 of the whole roll of the prepared top material layer roll 159. Similarly, the adhering process may be carried out by a roll-to-roll press molding machine. The whole roll of the prepared pre-composite layer roll 159 may comprise a top substrate 151 and a top conductive layer 161. Similarly, as shown in FIG. 7, the top material layer roll 159 is obtained after the whole roll of the top conductive layer 161 is adhered to the whole roll of the top substrate 151. As shown in FIG. 9, by the adhesive property of the bottom optically clear adhesive 140, the prepared top material layer roll 159 and the bottom optically clear adhesive 140 are adhered to the patterned bottom conductive layer 120 of the composite layer roll 101, and covering the bottom strip layer 130 at the same time. In this embodiment, the material of the top substrate 151 and the top conductive layer 161 of the prepared top material layer roll 159 are similar to which in the aforesaid embodiment, and are not narrated herein.

No matter which adhering process is taken, one of the features of the present invention is to use the continuous roll-to-roll adhesion process to obtain the stack rolls. Although the adhering process illustrated in FIG. 6 and FIG. 9 are different, they get the same stack roll 104 as shown in FIG. 10, FIG. 10A and FIG. 10B after the adhering process is completed.

Figure 10:
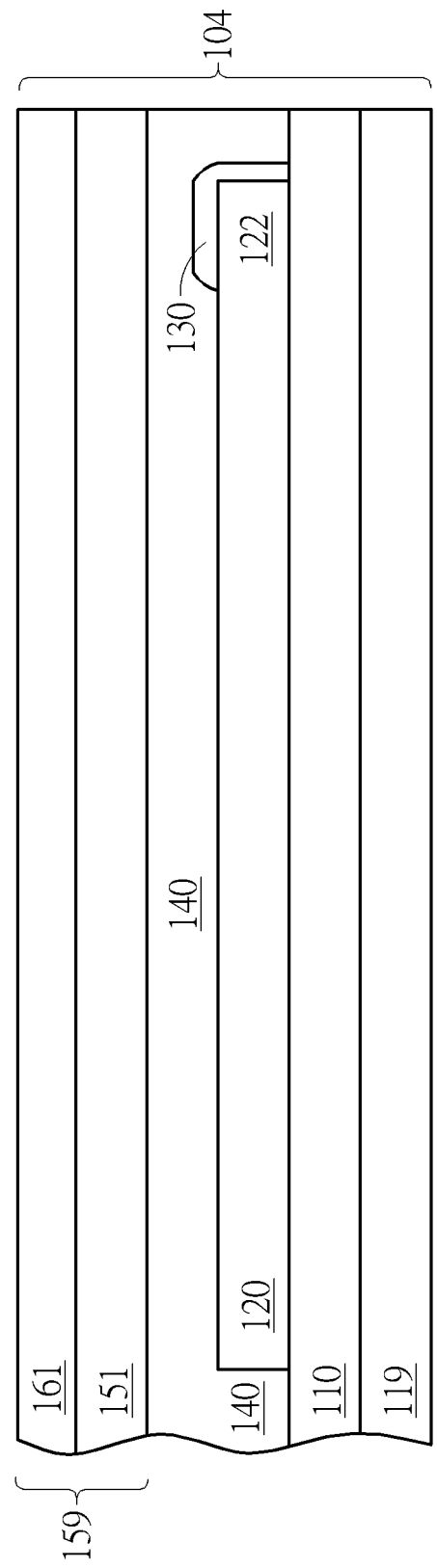
Figure 10A:
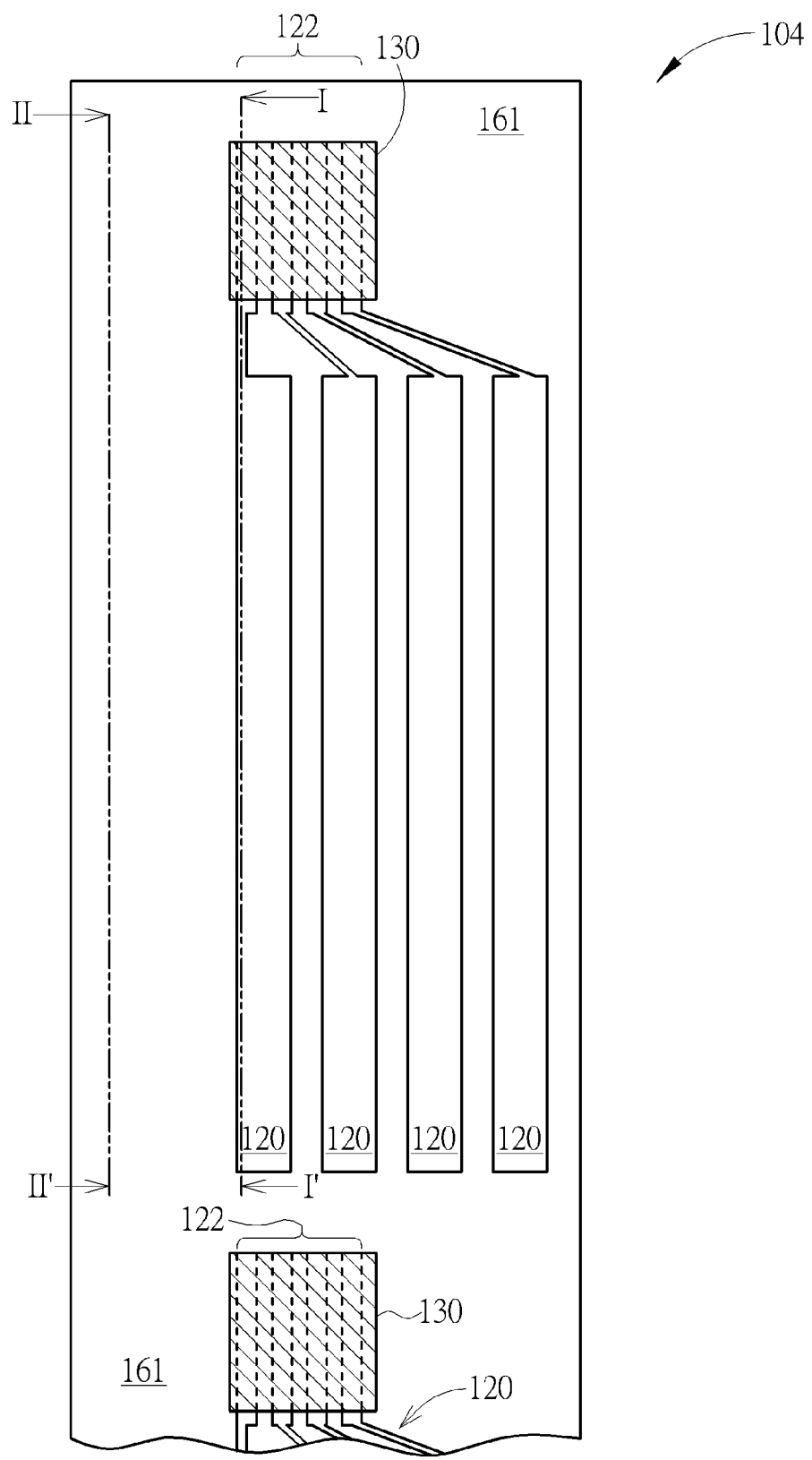
Figure 10B:
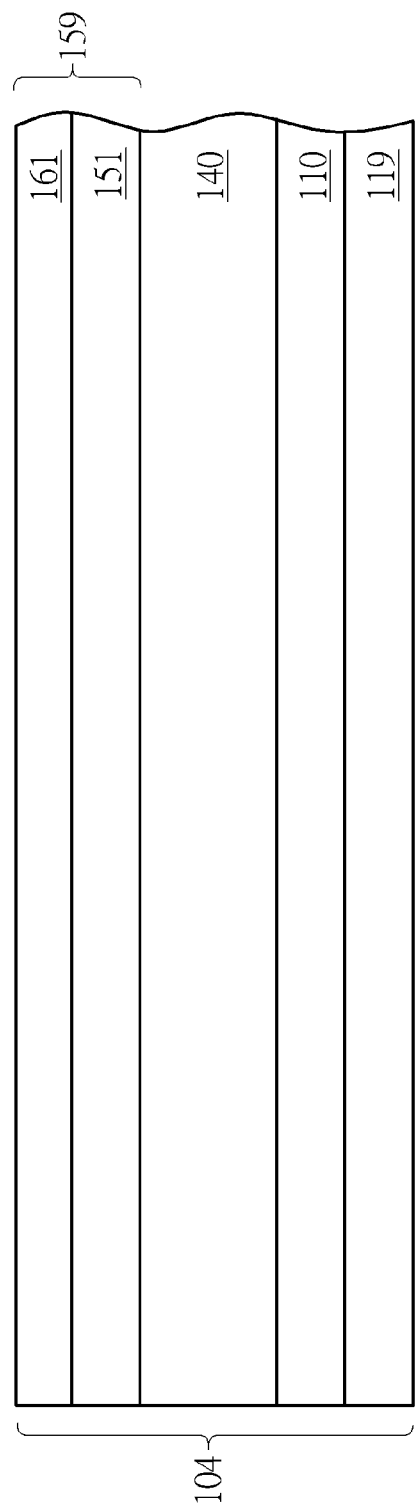
FIG. 10B is a schematic, cross-sectional diagram taken along line II-II' of FIG. 10A.

Subsequently, in the following process, the top conductive layer 161 of the stack roll 104 shown in FIG. 10, FIG. 10A and FIG. 10B is patterned to obtained the patterned top conductive layer 160.

Figure 11:
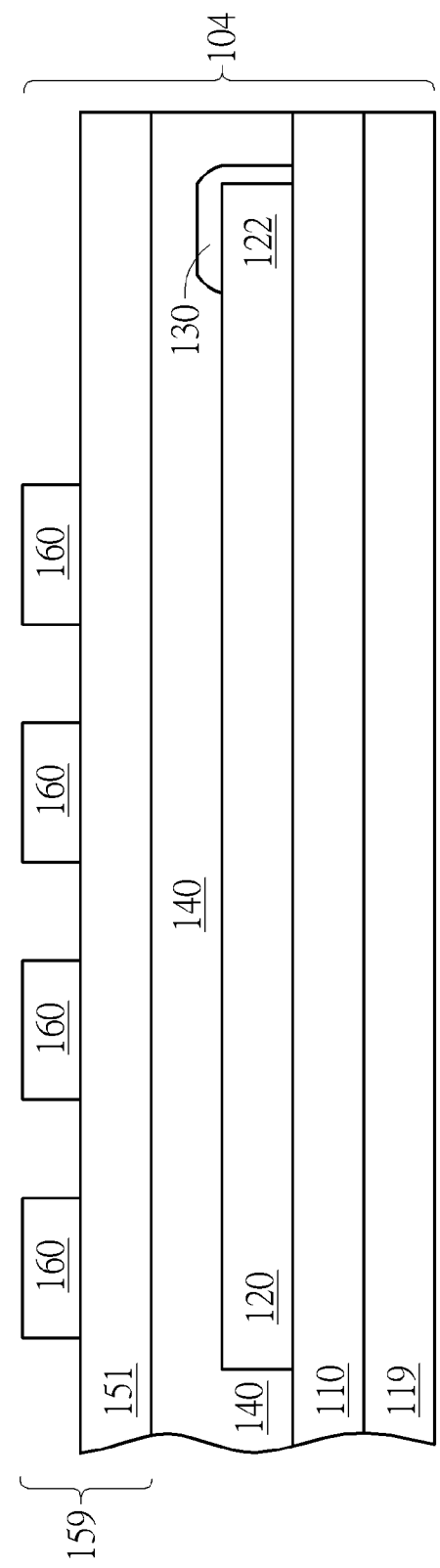
Figure 11A:
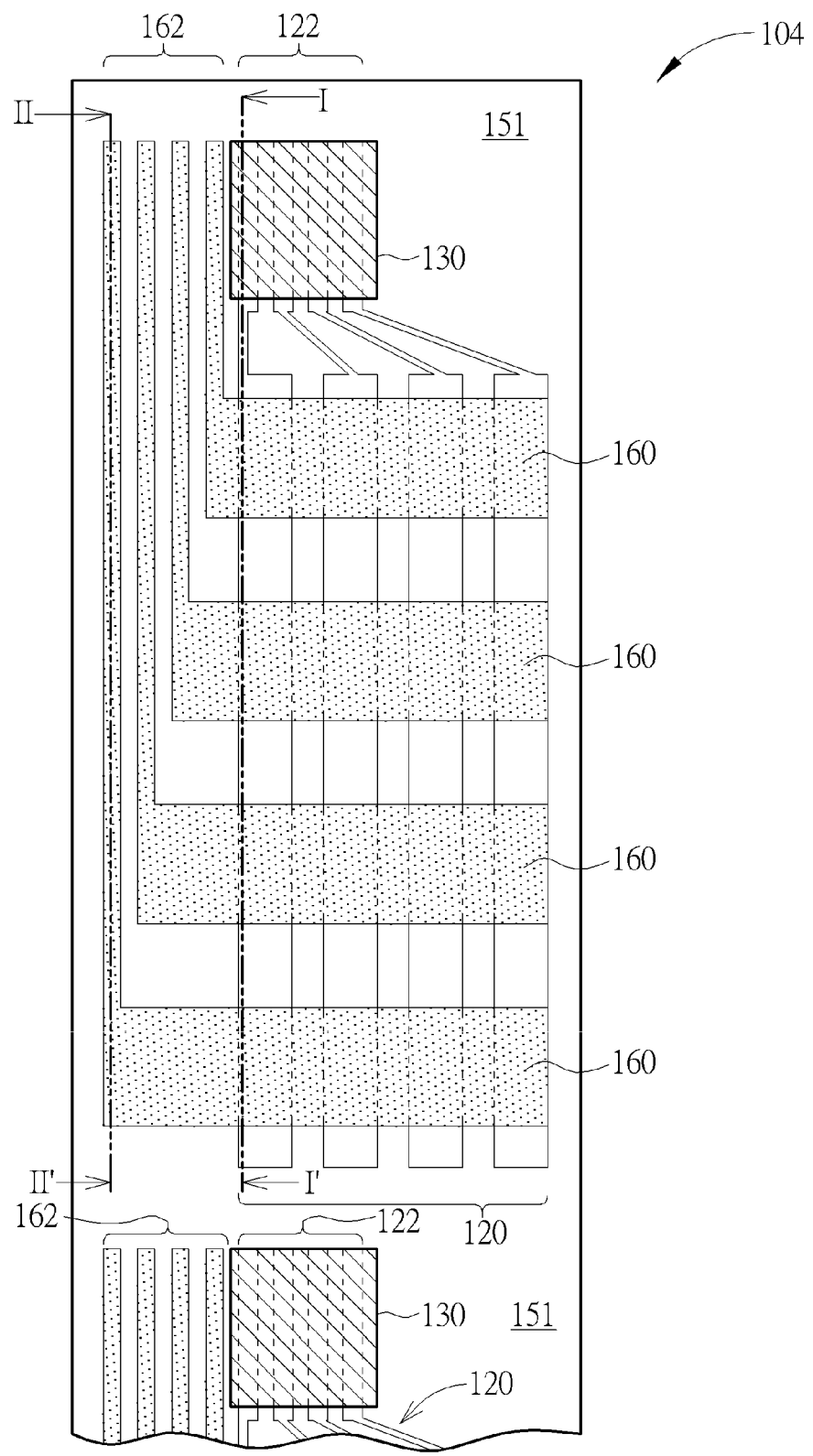
Figure 11B:
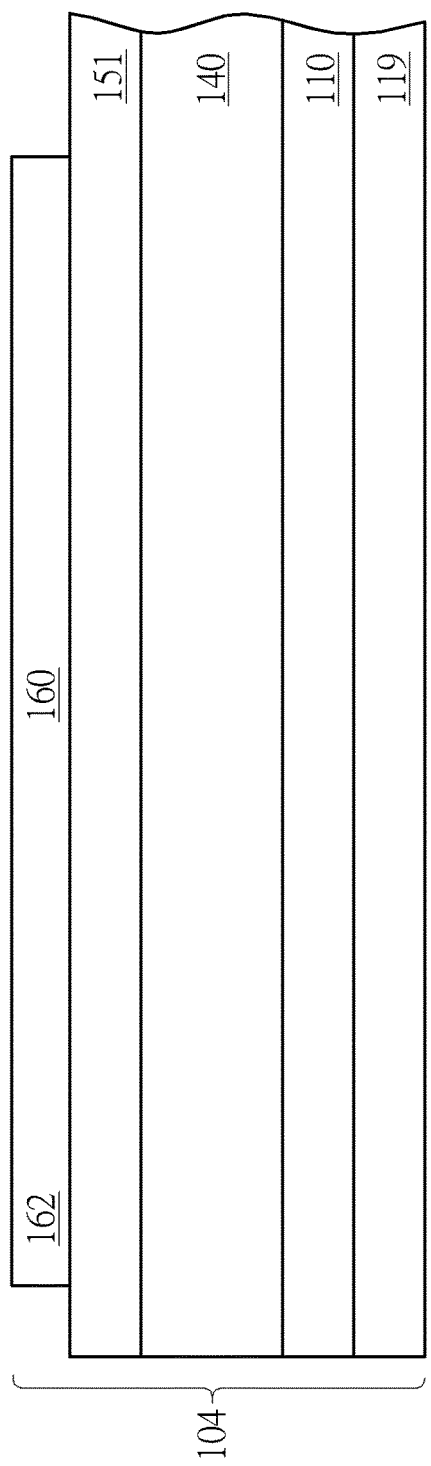
FIG. 11B is a schematic, cross-sectional diagram taken along line II-II' of FIG. 11A.

Please refer to FIG. 11, FIG. 11A and FIG. 11B. The patterned bottom conductive layer 120 under the top conductive layer 161 may be the alignment target during the patterning process. The top conductive layer 161 may be patterned by etching process. Top conductive terminals 162 are formed at the end of the patterned top conductive layer 160 during patterning process and electrically connected to the patterned top conductive layer 160. Top conductive terminals 162 are adjacent to the bottom conductive terminals 122. In an embodiment of the invention, the top conductive layer 161 is patterned by block-type exposure, which aligns with the patterned bottom conductive layer 120.

By taking the underneath patterned bottom conductive layer 120 as the alignment target, the top conductive terminals 162 may be more precisely aligned with the bottom conductive terminal 122 and more accurately positioned adjacent to the bottom conductive terminal 122. Preferably, this method may reduce the misalignment between the top conductive terminal 162 and the bottom conductive terminal 122 to less than 30 µm, e.g. only 20 to 30 µm. In another embodiment of the present invention, when the misalignment between the top conductive terminals 162 and the bottom conductive terminals 122 is less than 30 µm, it is substantially considered to be no misalignment. Unlike the sheet-to-sheet adhering batch production mode in prior art, the method provided by this invention only need one alignment step, and the misalignment between the patterned top conductive layer 160 and the patterned bottom conductive layer 120 is reduces, and a product with better quality is provided.

Figure 12:
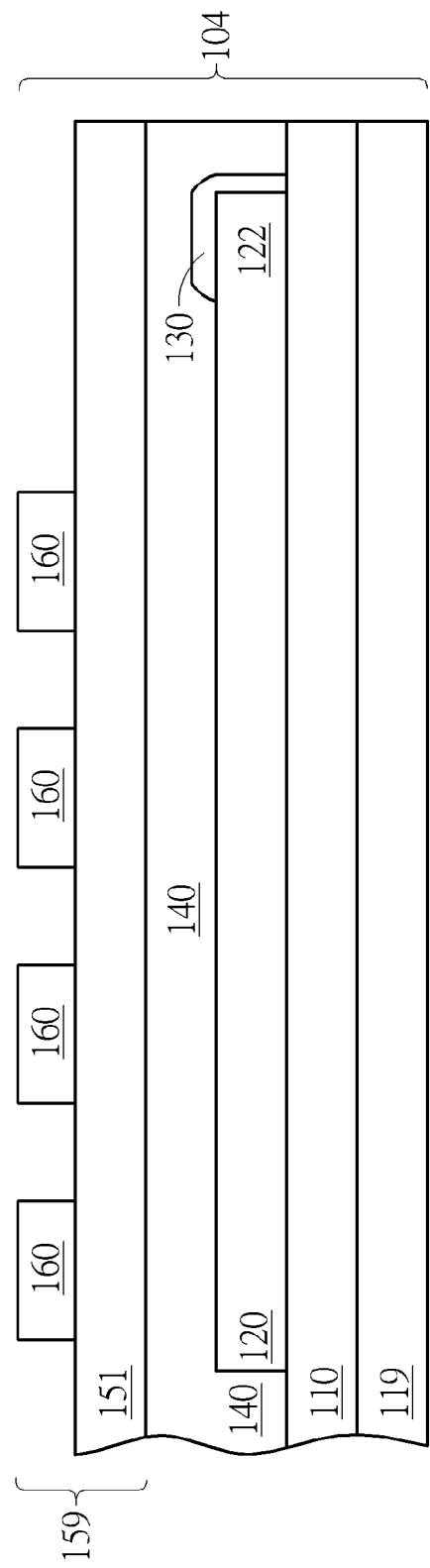
Figure 12A:
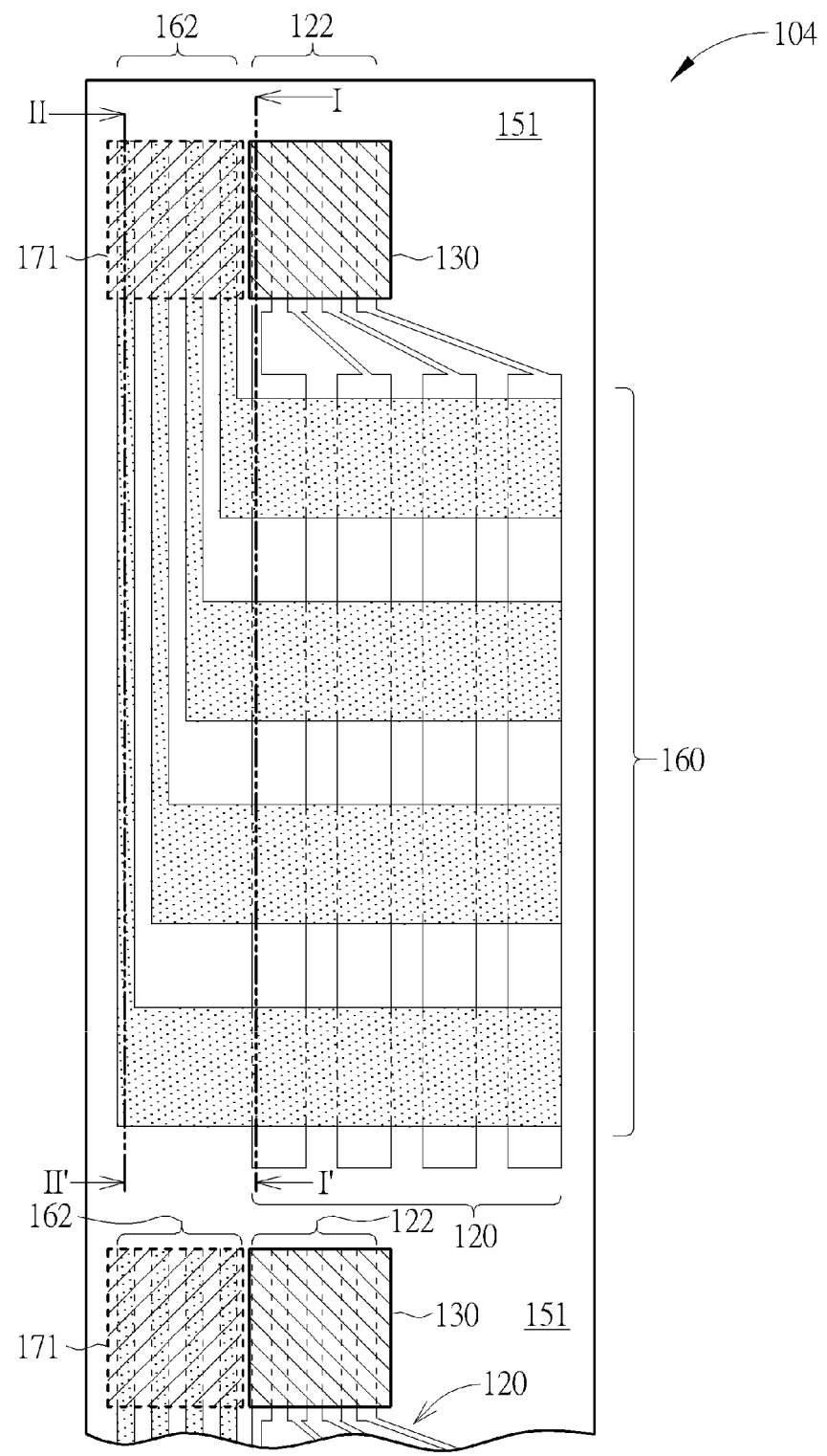
Figure 12B:
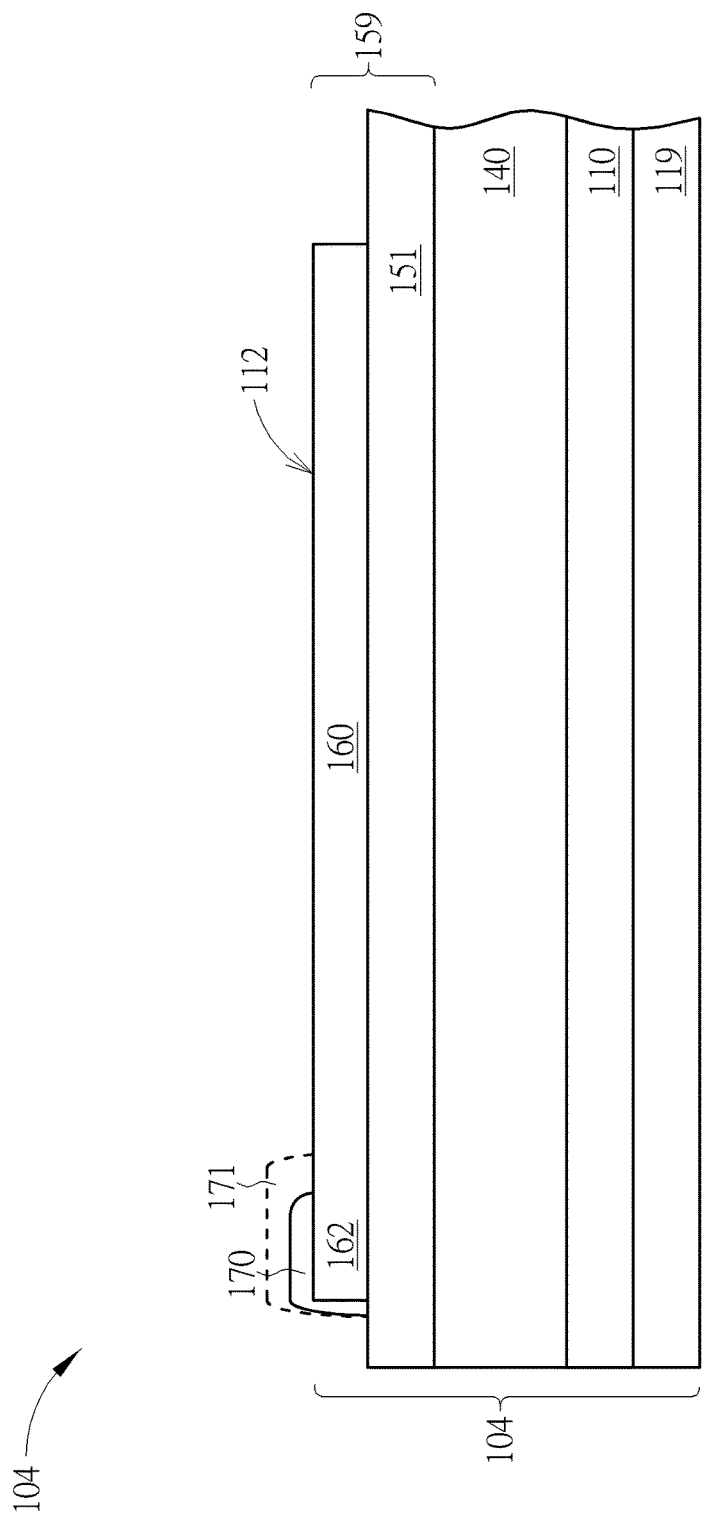
FIG. 12B is a schematic, cross-sectional diagram taken along line II-II' of FIG. 12A.

After the top conductive layer 161 is patterned, a top strip layer 170 is formed on the patterned top conductive layer 160 of top material layer roll 159, covering the top conductive terminals 162 of the patterned top conductive layer 160. Please refer to FIG. 12, FIG. 12A and FIG. 12B, showing the steps to form the top strip layer 170 onto the patterned top conductive layer 160 of the top material layer roll 159. First, a top strip layer liquid 171 (dashed line) is applied onto the patterned top conductive layer 160 of the top material layer roll 159, and covers the top conductive terminals 162 of the patterned top conductive layer 160. The top strip layer liquid 171 may comprise adhesive polyvinyl chloride (PVC) liquid glue, and be applied onto the top material layer roll 159 by printing technique. Subsequently, the adhesive top strip layer liquid 171 is cured to obtain the top strip layer 170. The top strip layer liquid 171 may be baked at a temperature between 50° C. to 200° C. for a time period such as 10 to 30 minutes. The top strip layer liquid 171 may shrink and loss its viscosity after the curing process, become the bottom strip layer 170 which only adheres on the top conductive terminals 162.

Optionally, the strip layers may have colors for the ease of the cutting, sawing or stripping steps in the later process. Preferably, the bottom strip layer liquid 131 and the top strip layer liquid 171 have different colors to obtain the bottom strip layer 130 and top strip layer 170 with different colors which can be more easily recognized.

Figure 13:
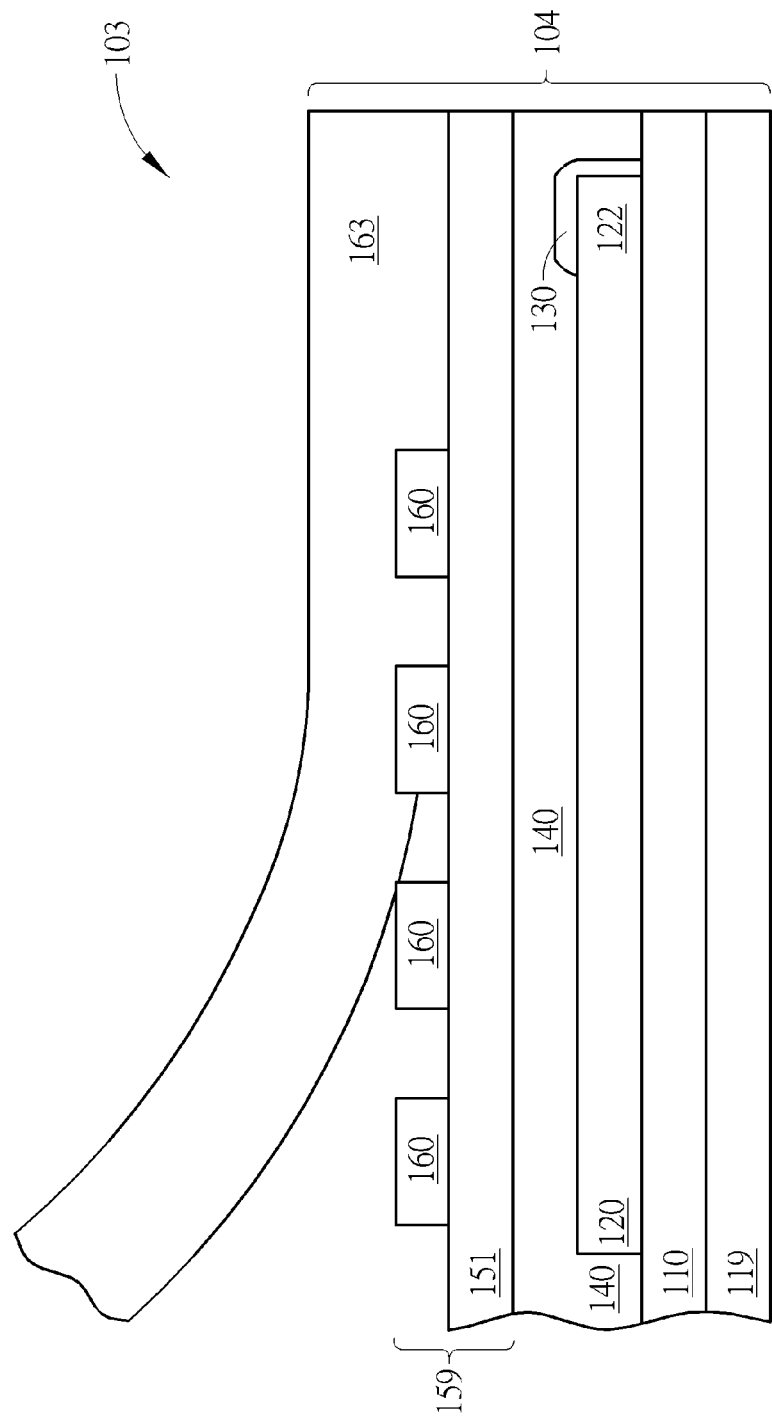
Figure 13A:
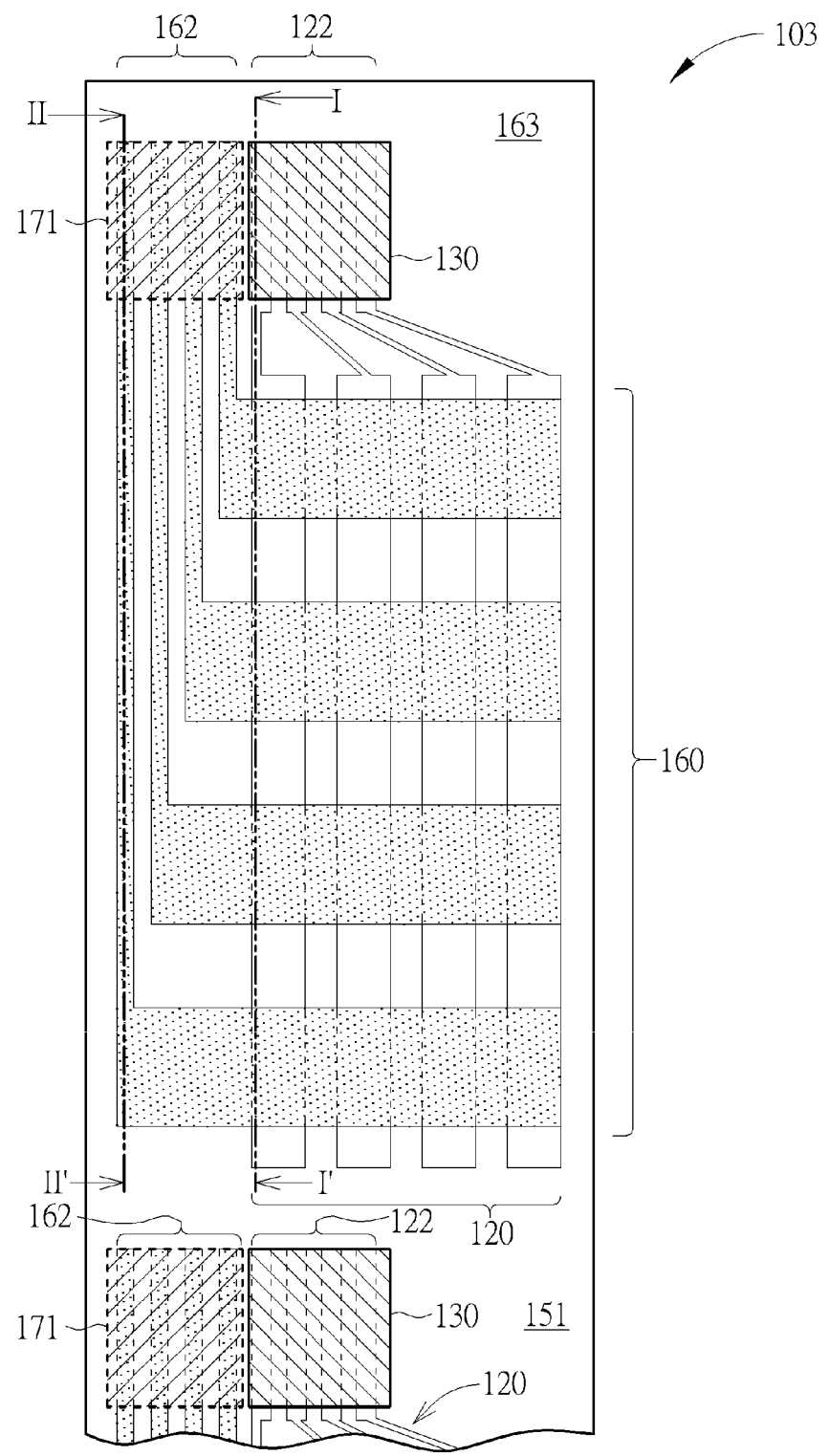
Figure 13B:
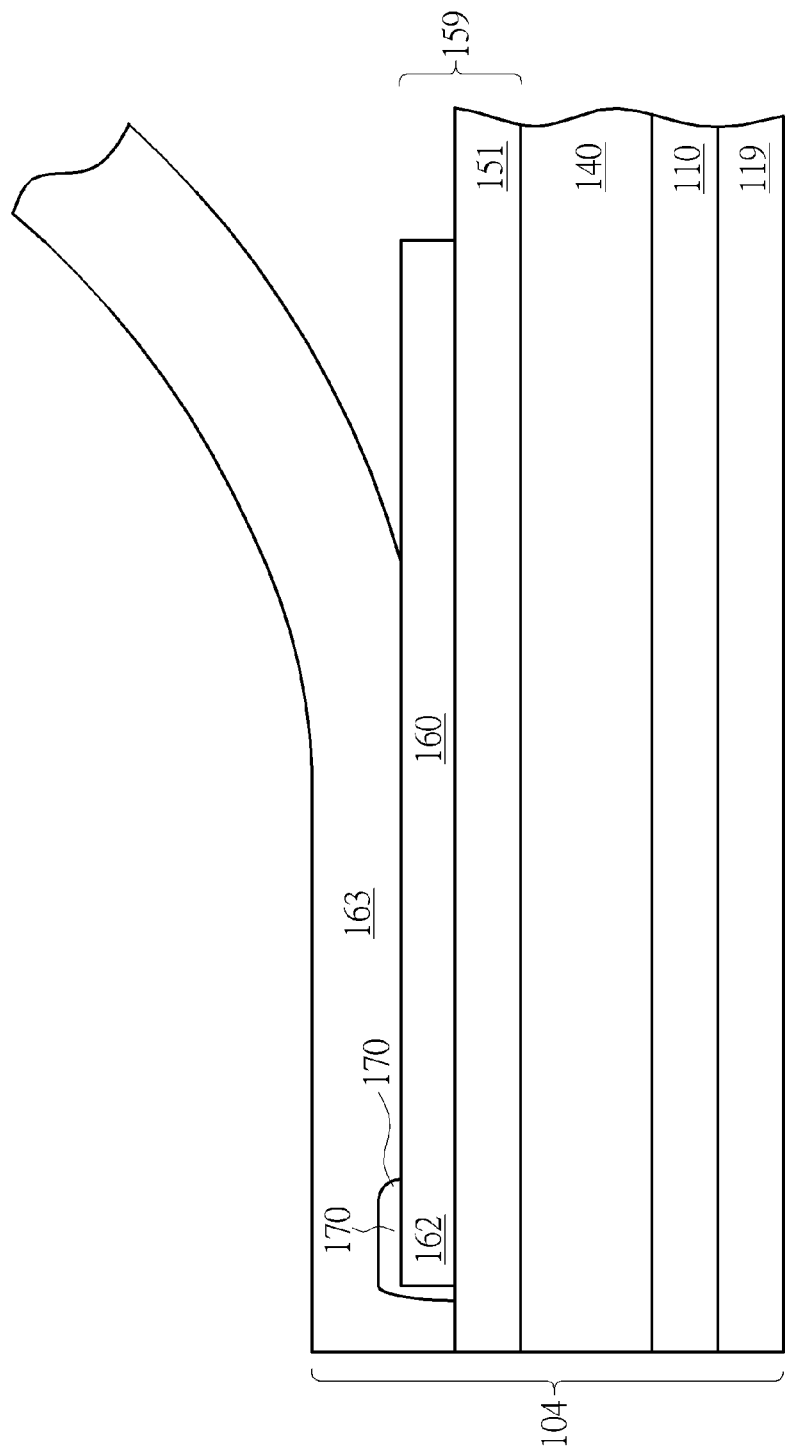
FIG. 13B is a schematic, cross-sectional diagram taken along line II-II' of FIG. 13A.

Next, as shown in FIG. 13, FIG. 13A and FIG. 13B, a whole roll of a top optically clear adhesive 163 is adhered to the patterned top conductive layer 160 of the whole roll of the top material layer roll 159. The top optically clear adhesive 163 covers the top strip layer 170. A semi-finished touch film stack roll 103 is obtained after the adhering process. The roll-to roll adhering production mode simplifies the adhering process that the repeating steps to align the top optically clear adhesive 163 with the patterned top conductive layer 160 may be omitted from the adhering process. The touch film stack roll 103 according to the present invention comprises at least one of the non-viscous bottom strip layer 130 and the top strip layer 170 in the film stack.

Figure 14:
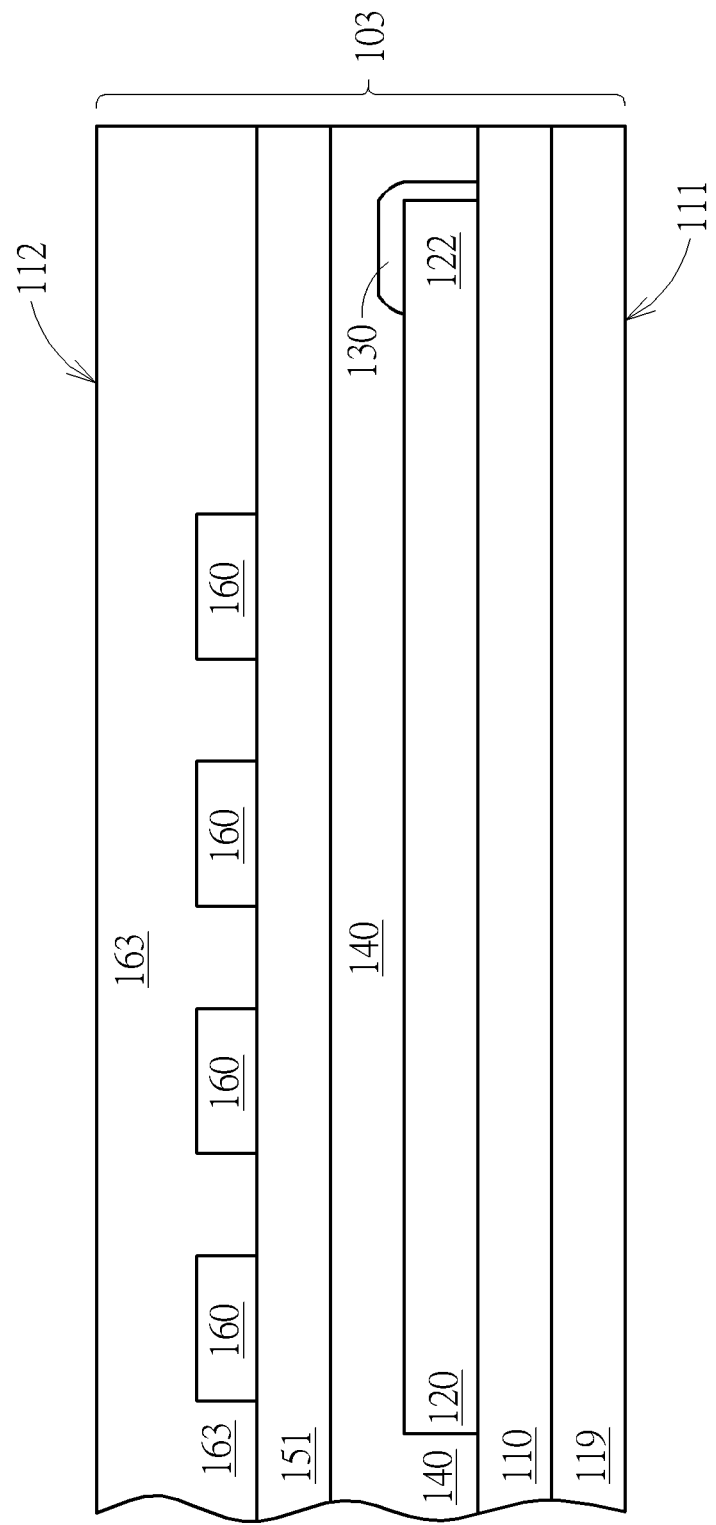
Figure 14A:
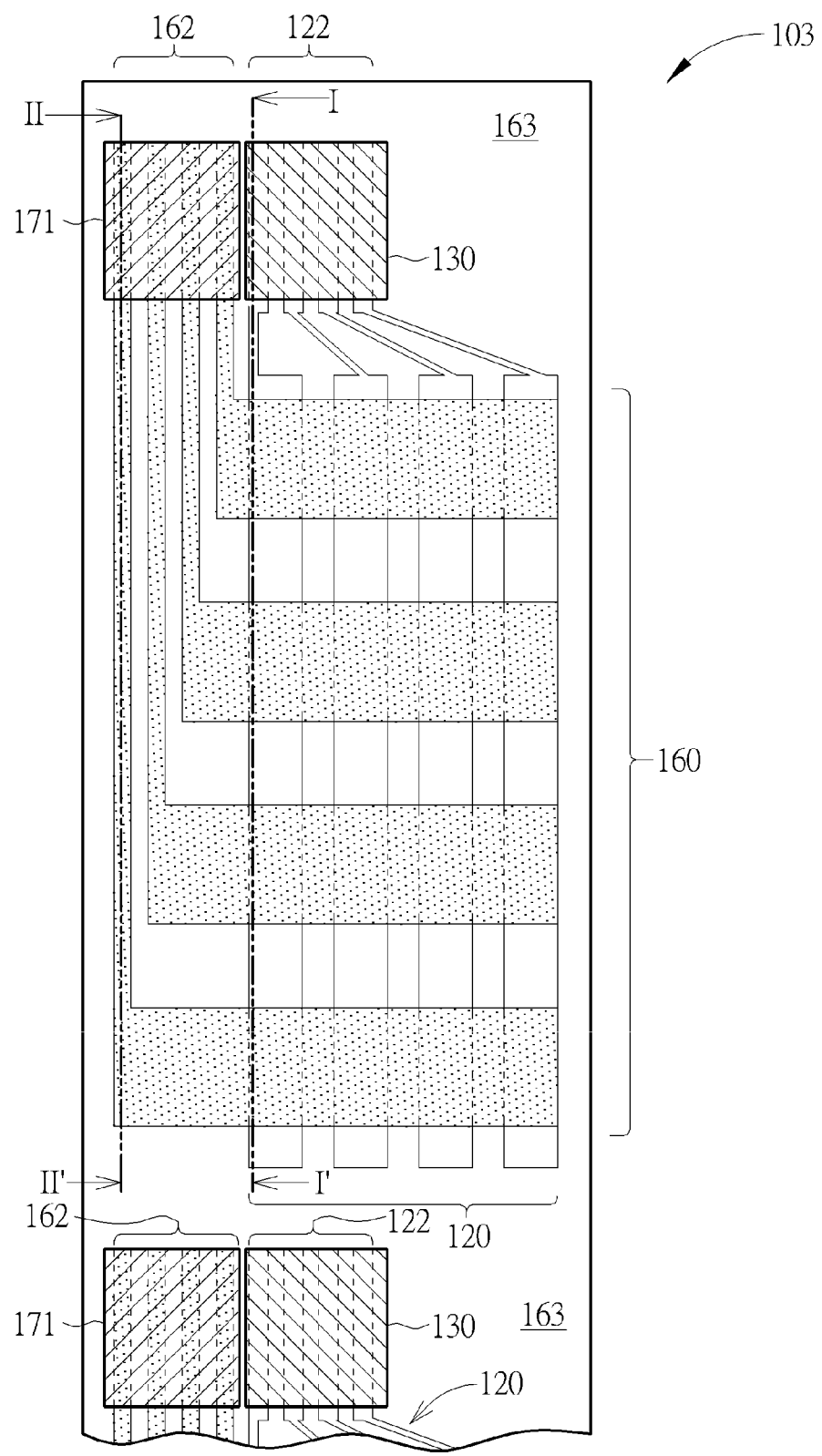
Figure 14B:
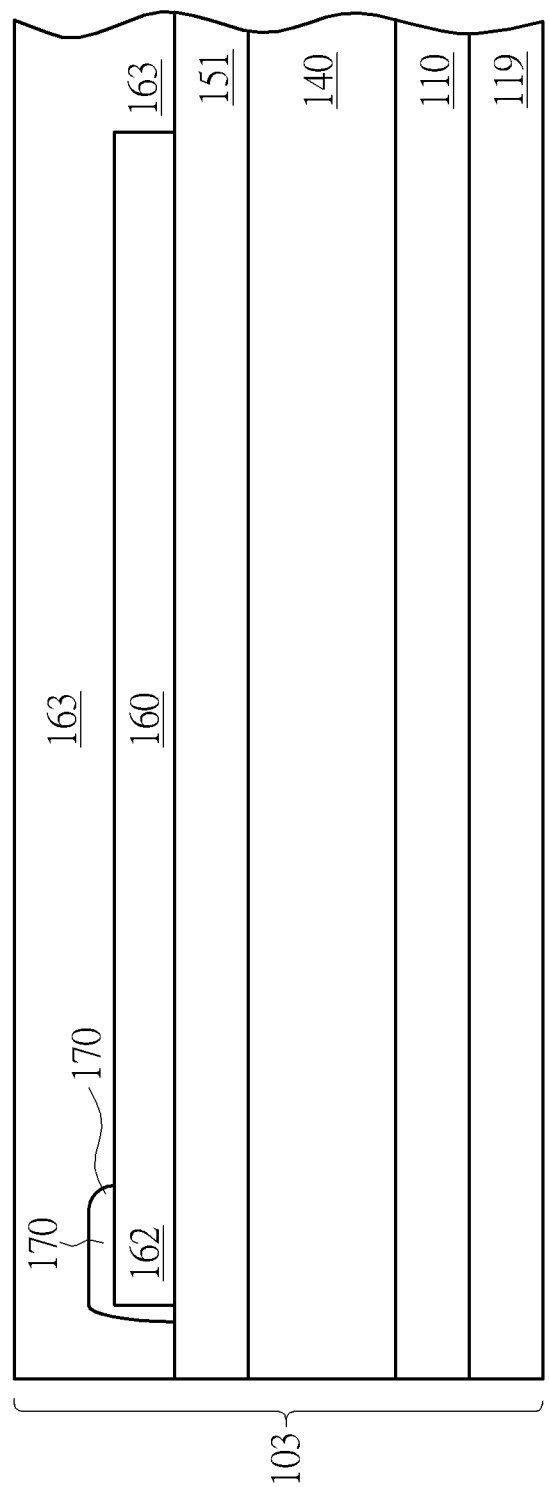
FIG. 14B is a schematic, cross-sectional diagram taken along line II-II' of FIG. 14A.

The touch film stack roll 103 as shown in FIG. 14, FIG. 14A and FIG. 14B is obtained after the aforesaid steps. In the following process, as shown in FIG. 15, FIG. 15A, FIG. 15B, FIG. 16, FIG. 16A and FIG. 16B, multiple cutting steps are carried out to cut the touch film stack roll 103 to obtain a single sheet of a semi-finished touch film stack 105.

The touch film stack roll 103 comprises a first surface 111, which is the bottom substrate 110, and a second surface 112, which is the top optically clear adhesive 163. The bottom conductive layer region 124 comprises the bottom conductive terminals 122 which are covered by the bottom strip layer 130. The top conductive layer region 164 comprises the top conductive terminals 162 which are covered by the top strip layer 170.

Figure 15:
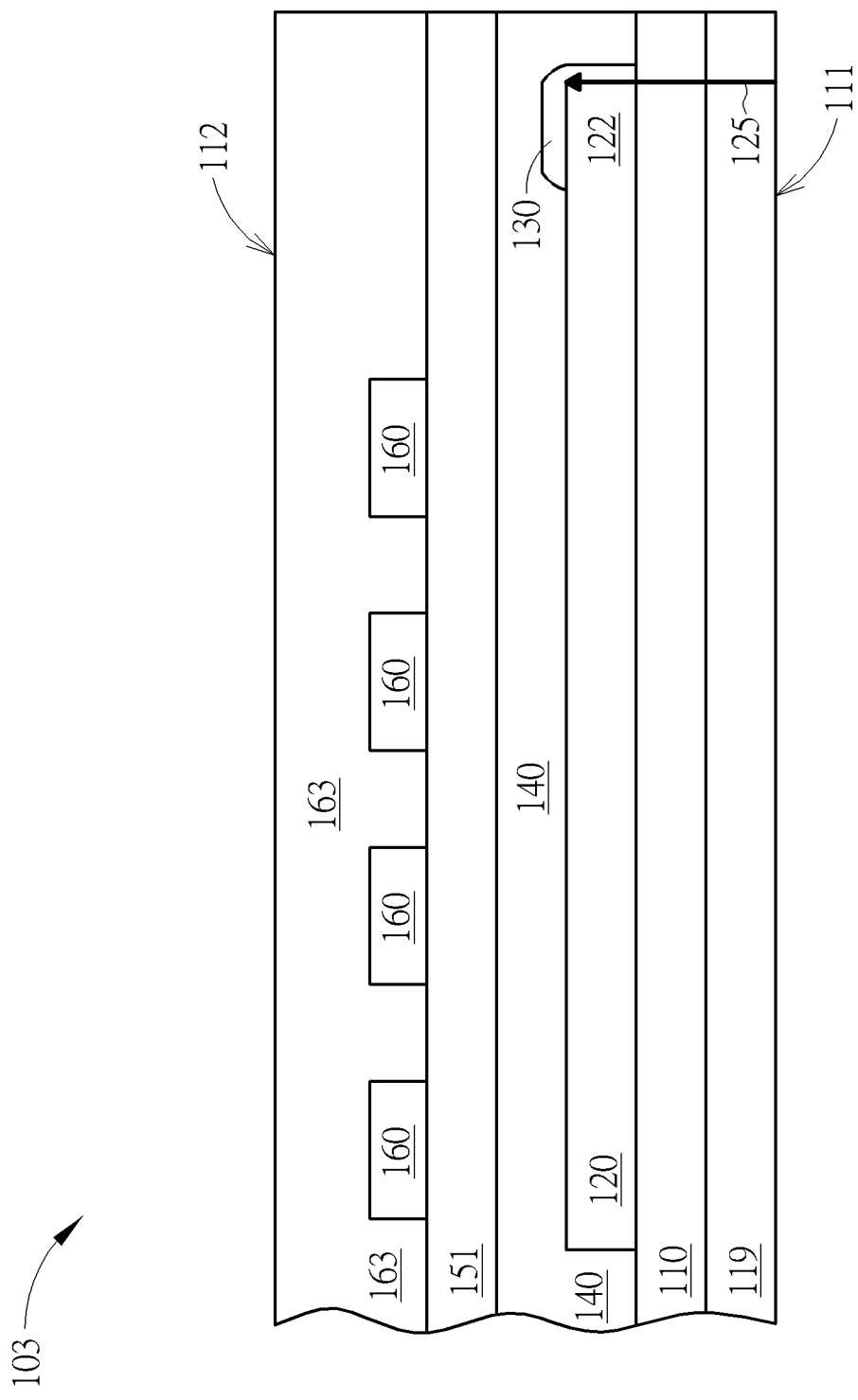
Figure 15A:
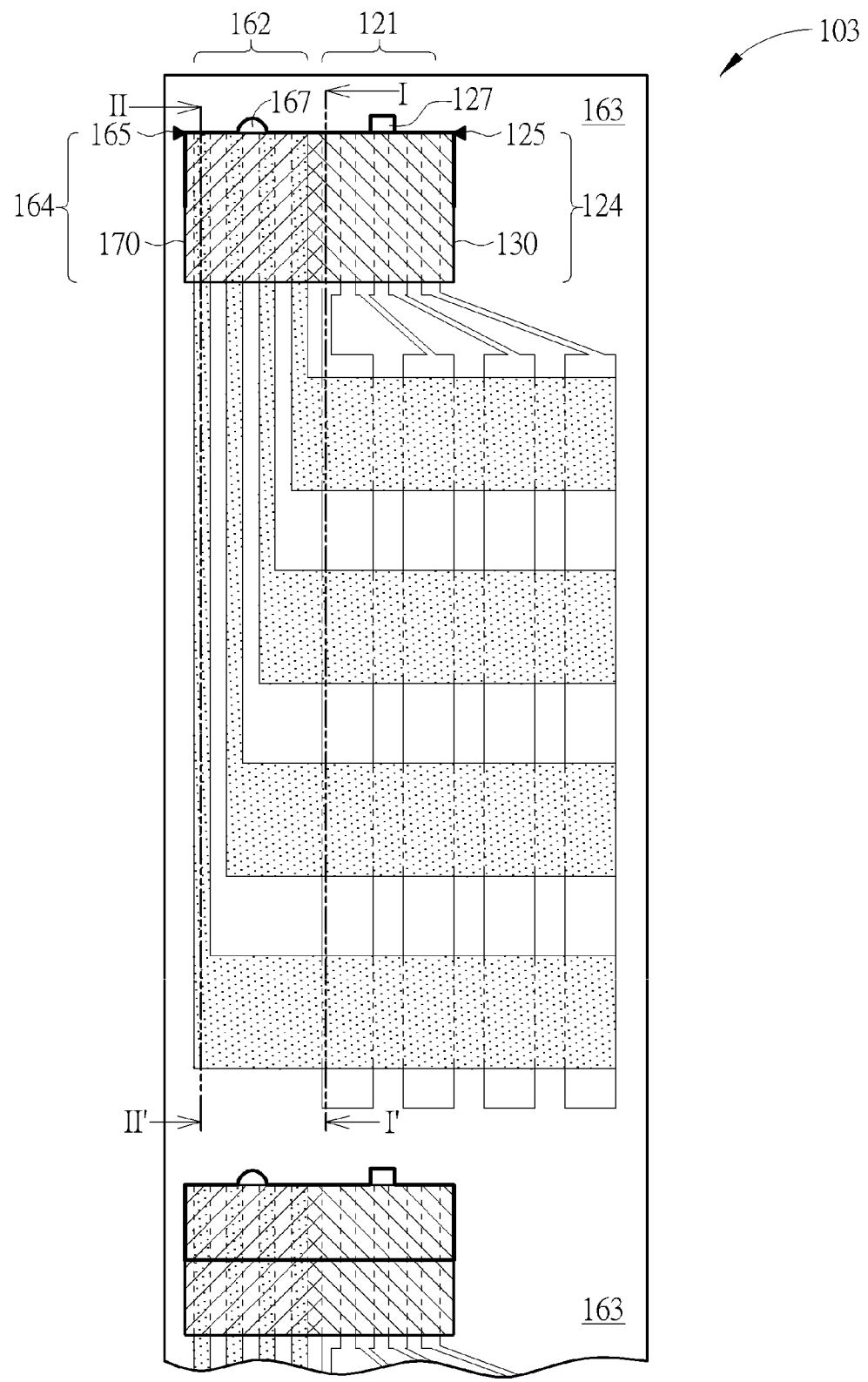
Figure 15B:
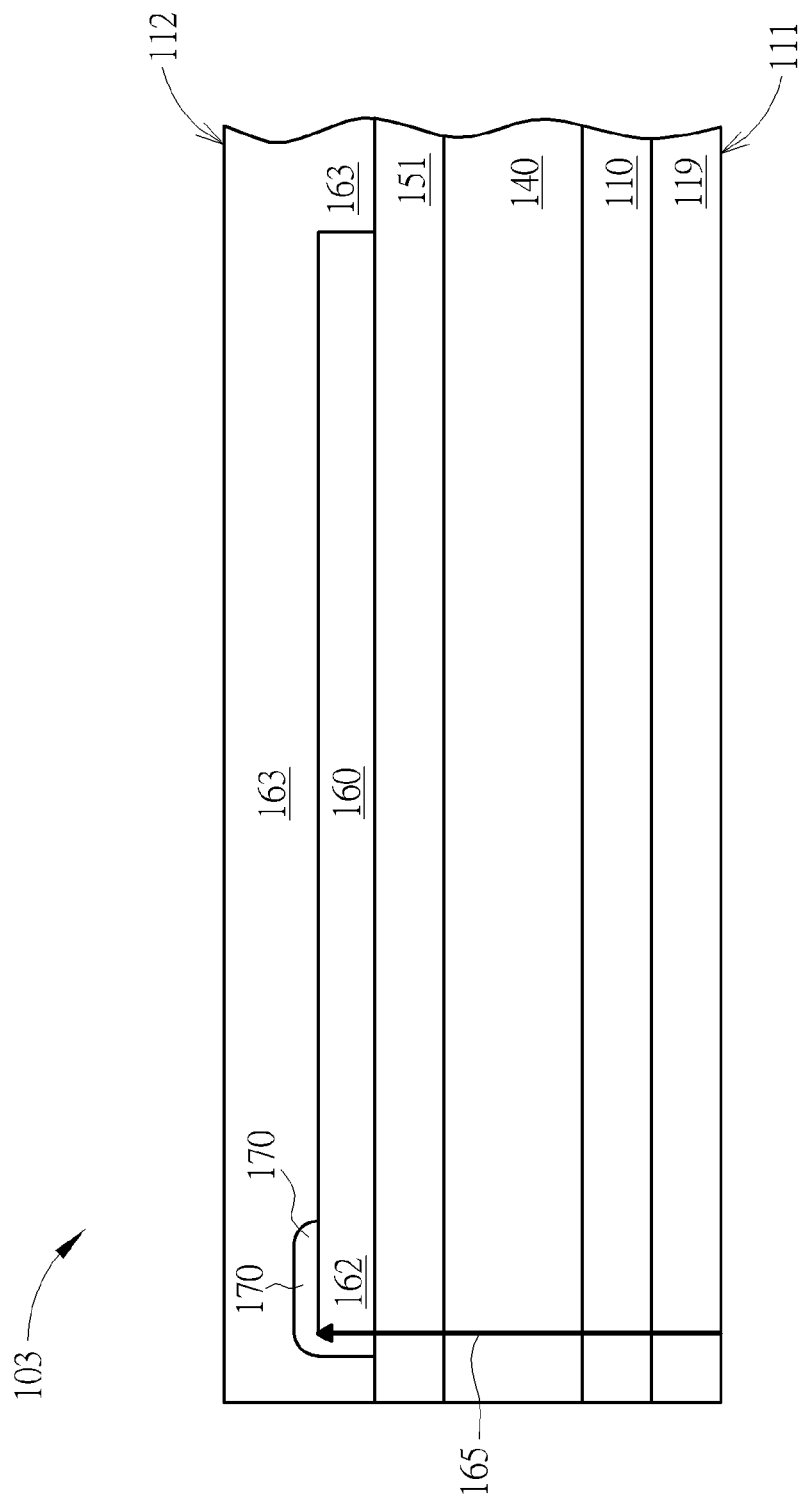
FIG. 15B is a schematic, cross-sectional diagram taken along line II-II' of FIG. 15A.

As shown in FIG. 15 and FIG. 15B, the touch film stack roll 103 is cut from the first surface 111. One of the features of the present invention is that not all films in the touch film stack roll 103 are cut through when cutting from the first surface. At least, the top substrate 151, even the top optically clear adhesive 163, is not cut through. For example, when cutting from the surface, a way of cutting 125 cuts to the carrier 119, the bottom substrate 110 and the bottom optically clear adhesive 140. A way of cutting 165 cuts to the top optically clear adhesive 163 of the patterned top conductive layer 160.

Figure 16:
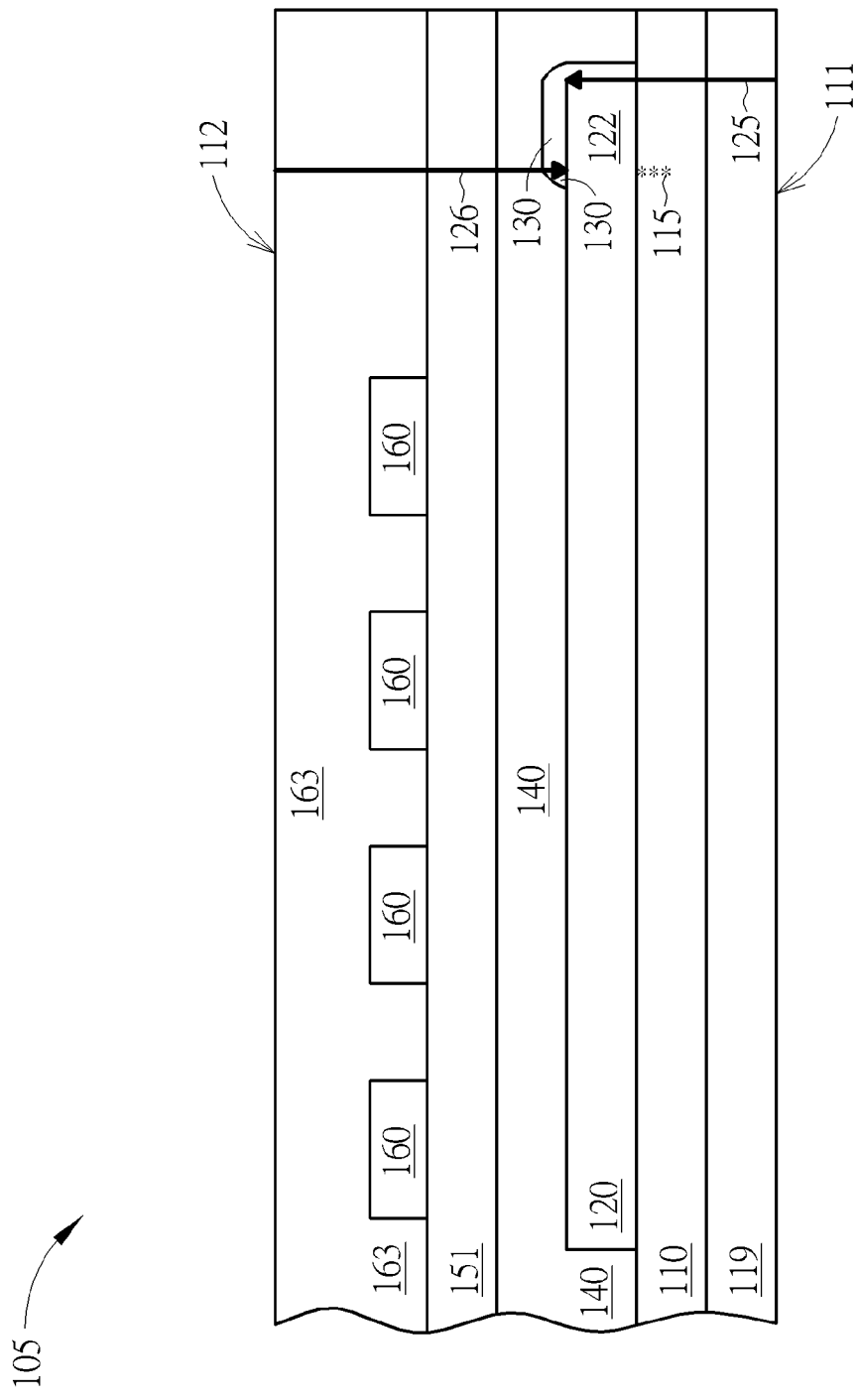
Figure 16A:
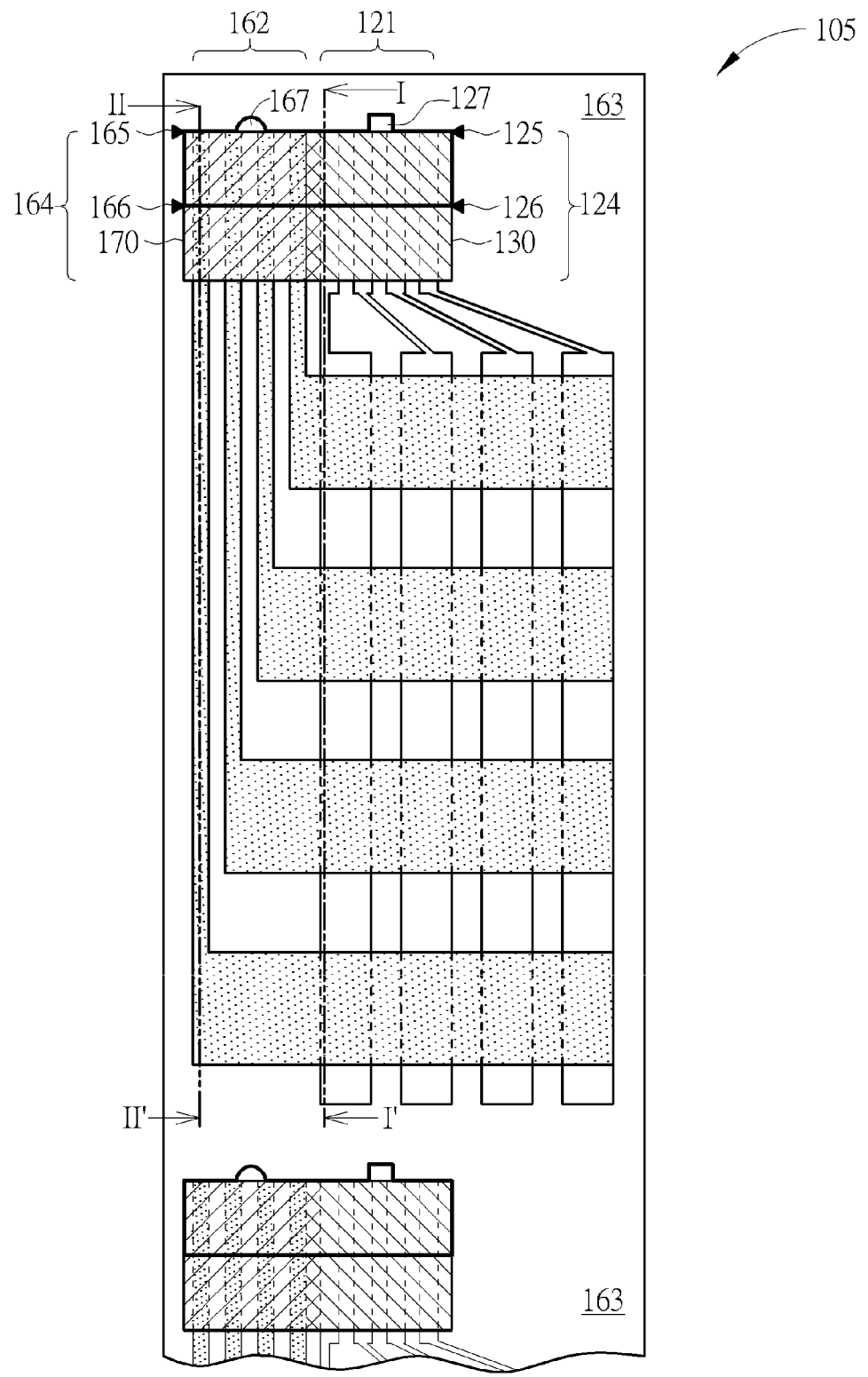
Figure 16B:
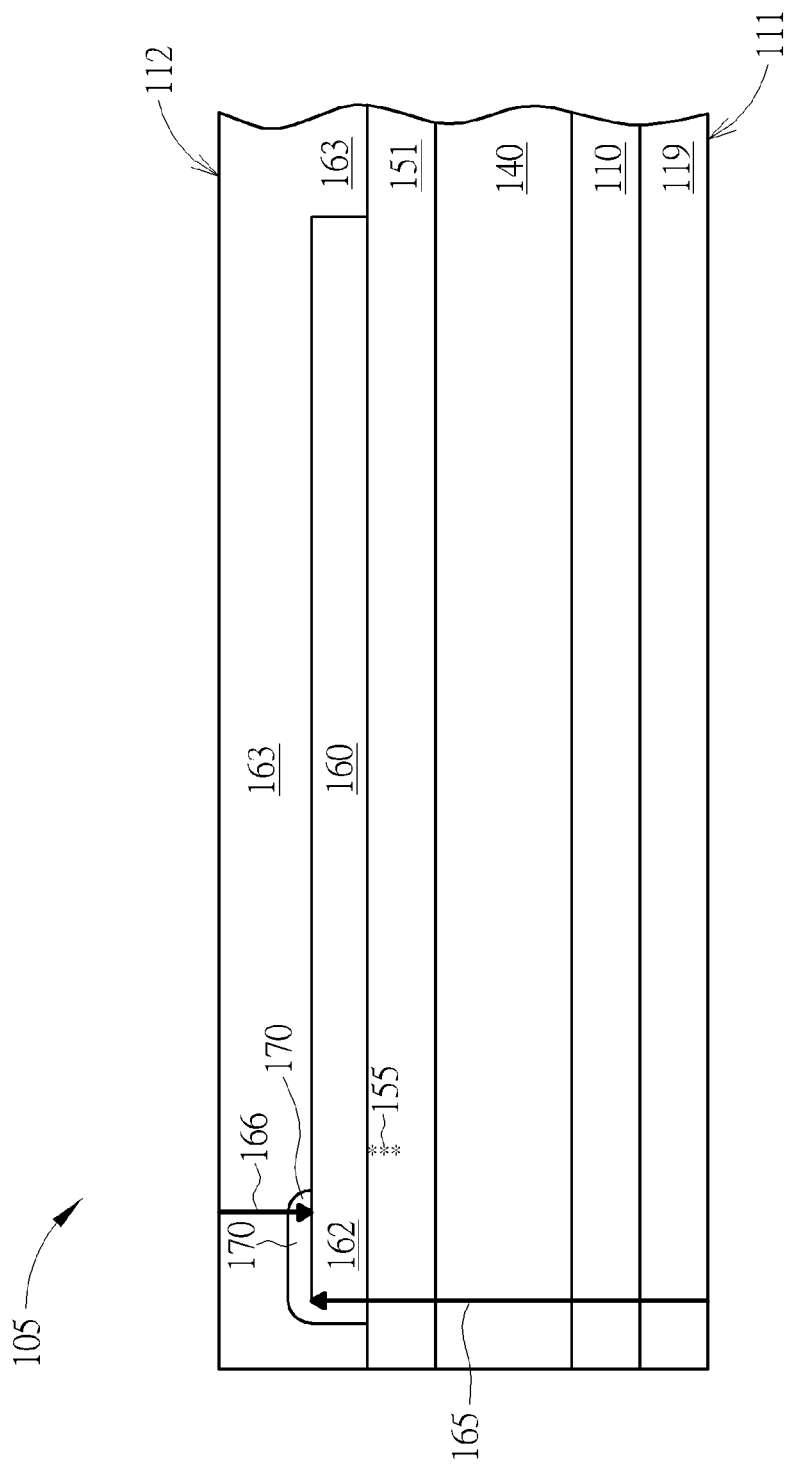
FIG. 16B is a schematic, cross-sectional diagram taken along line II-II' of FIG. 16A.

Subsequently, as shown in FIG. 16 and FIG. 16B, the touch film stack roll 103 is cut from the other surface, e.g., the second surface to obtain the single sheet of semi-finished touch film stack 105. Another feature of the present invention is that not all films in the touch film stack roll 103 are cut through when cutting from the second surface. For example, when cutting the touch film stack roll 103 from the second surface 112, a way of cutting 126 cuts to the bottom optically clear adhesive 140 of the patterned bottom conductive layer 120, and a way of cutting 166 cuts to the top optically clear adhesive 163 of the patterned top conductive layer 160. In other words, the bottom substrate 110 and the optional carrier 119 are not cut when cutting from the second surface.

The cutting steps aforesaid leave a cut mark 115 in the bottom substrate 110, and a cut mark 155 in the top substrate 151. In a preferred embodiment, a flap 127 in the bottom conductive layer region 124 and a flap 167 in the top conductive layer region 164 with different shapes may be formed after the cutting steps.

Figure 17:
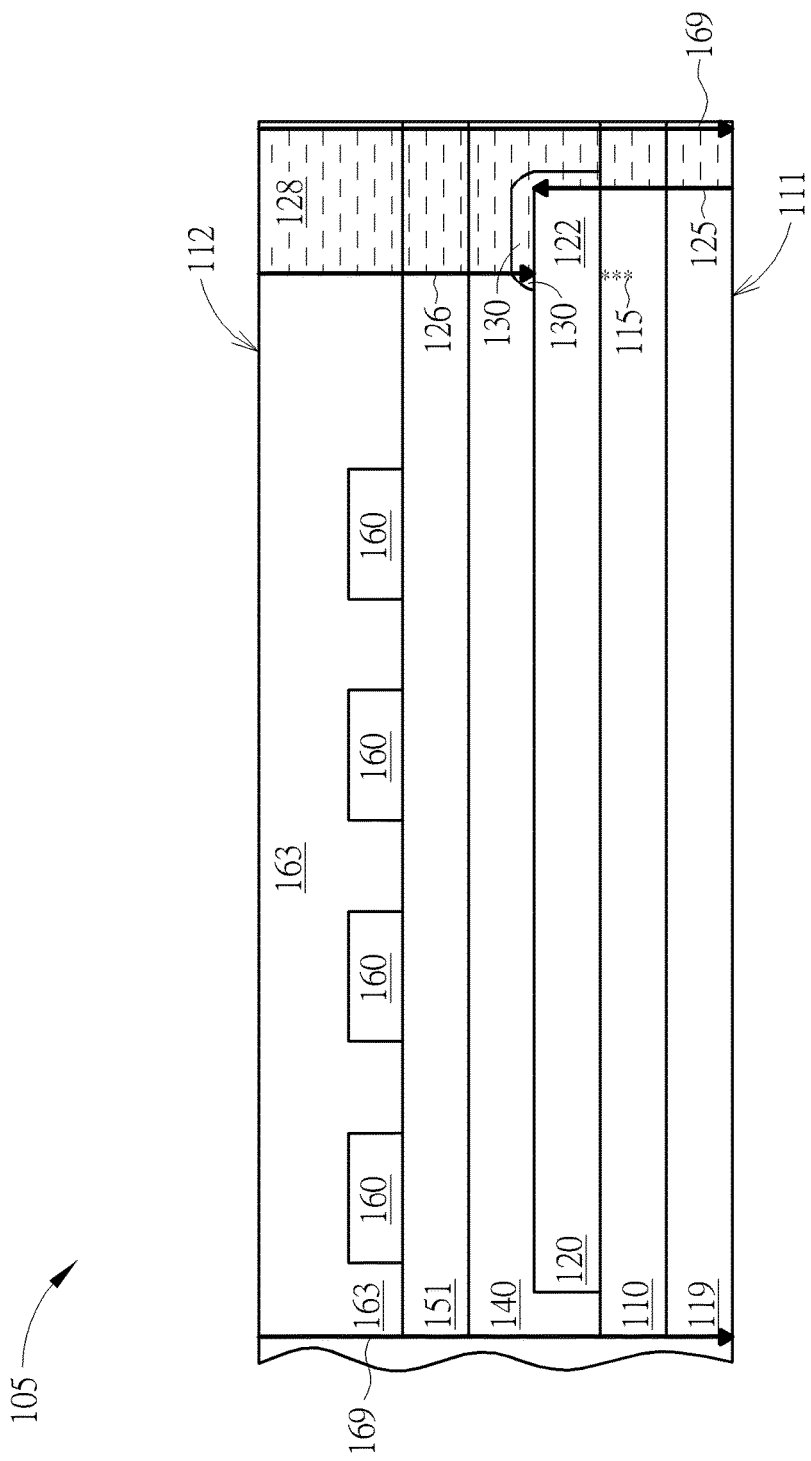
Figure 17A:
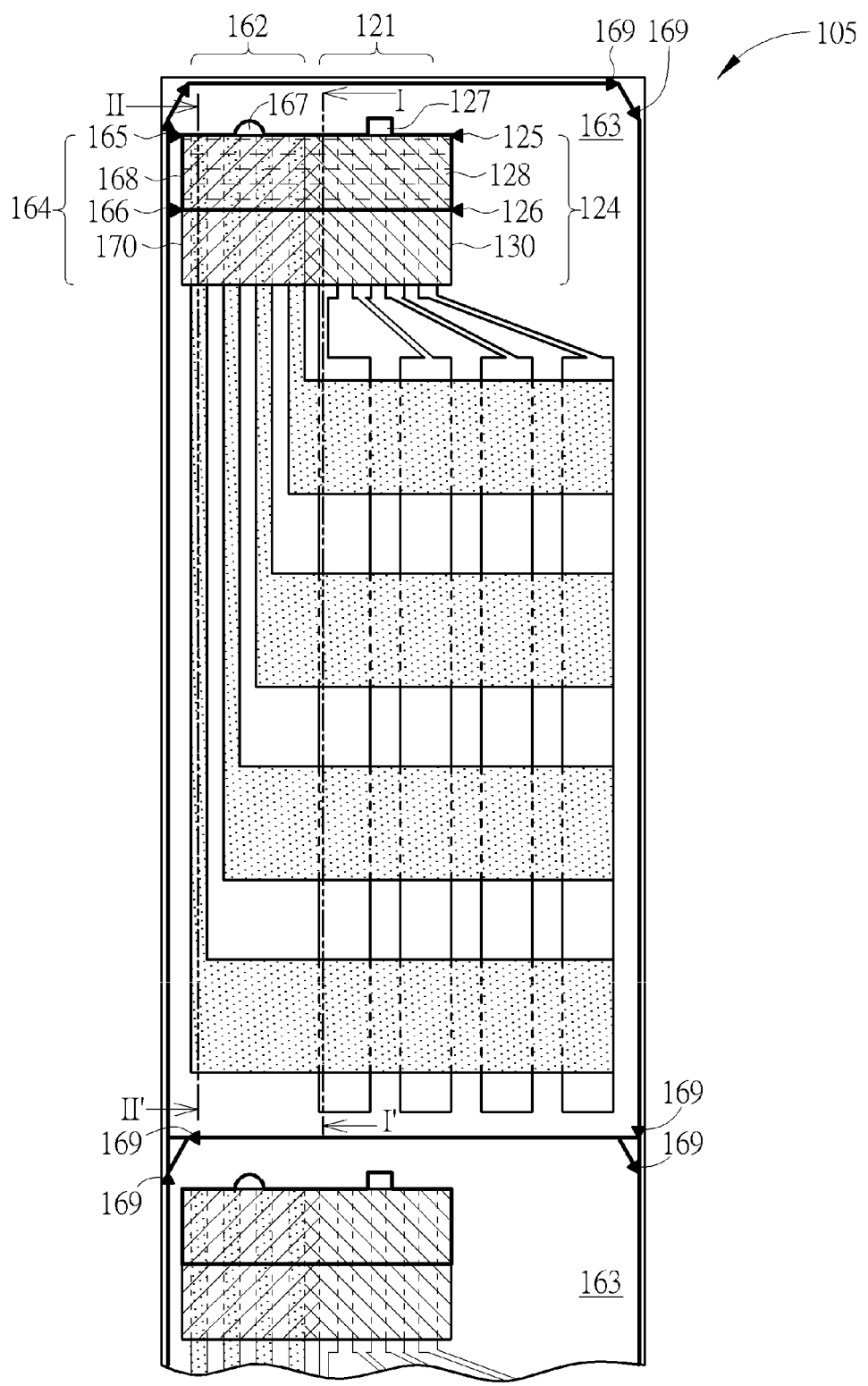
Figure 17B:
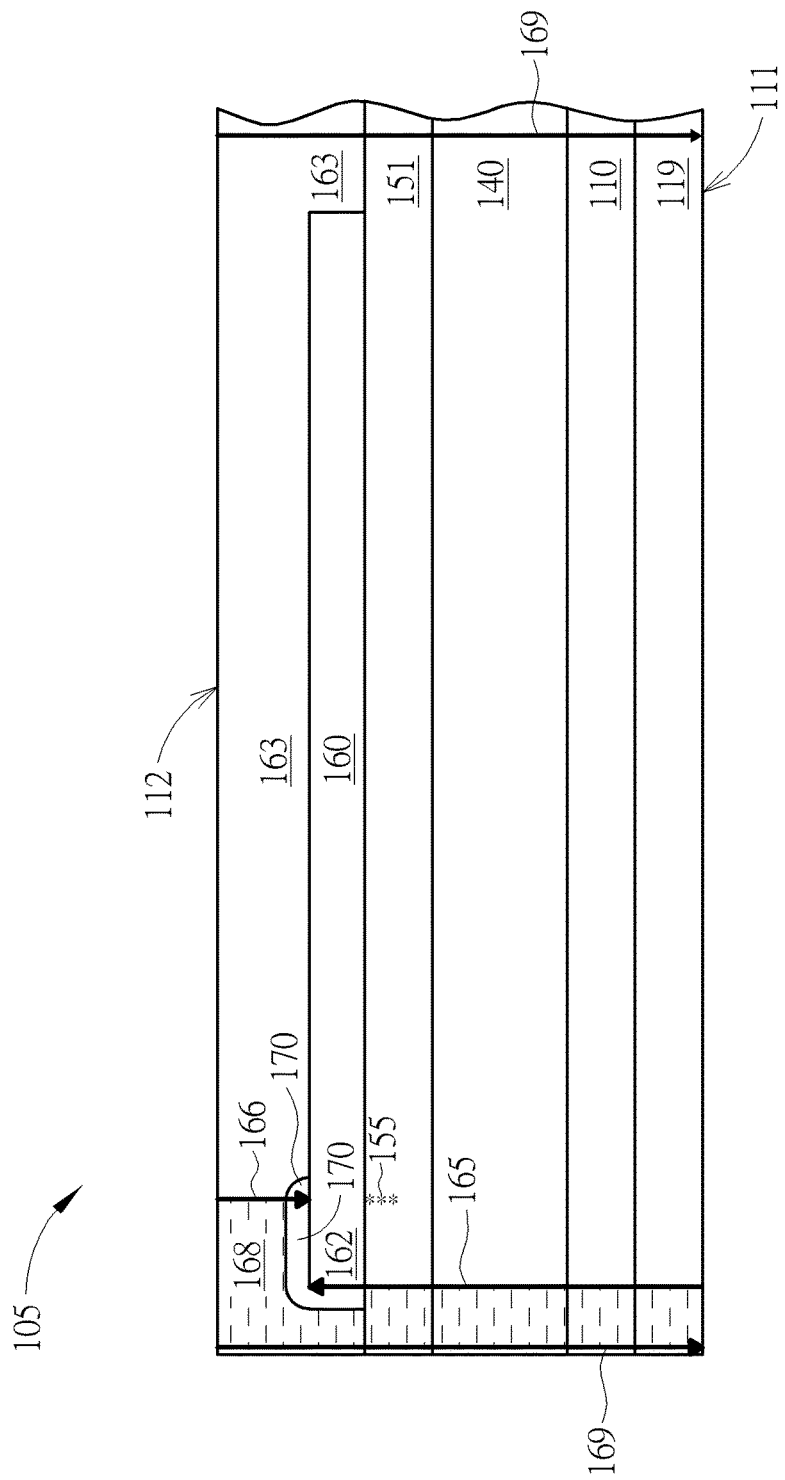
FIG. 17B is a schematic, cross-sectional diagram taken along line II-II' of FIG. 17A.

Please refer to FIG. 17, FIG. 17A and FIG. 17B. After the cutting steps are completed, a full cutting step 169 which cuts through all the films in the touch film stack roll 103 is carried out to cut along the outer edge of the each block pattern comprising the patterned top conductive layer 160 and the patterned bottom conductive layer 120. The full sawing step 169 is carried out many times to sawing the whole roll of the touch film stack roll 103, and thereby a plurality of single sheet of semi-finished touch film stacks 105 is obtained. Preferably, the shape of the single sheet of semi-finished touch film stack 105 may be customized according to the product's specification. For example, as shown in FIG. 17A, a hexagonal single sheet of semi-finished touch film stack 105 is obtained from sawing the touch film stack roll 103. With colored bottom strip layer 130 and top strip layer 170, it is easier to perform the cut or sawing steps on correct locations and to saw the roll into correct shapes.

In one embodiment of this invention, a first strip stack layer 128 and a second strip stack layer 168 of the single sheet of semi-finished touch film stack 105 are obtained by the cutting and sawing step aforesaid. As mentioned previously, the cut marks 115 in the bottom substrate 110 and the cut marks 155 in the top substrate 151 are also formed by the cutting steps. The first strip stack layer 128 and the second strip stack layer 168 are the bottom conductive layer region 124 and top conductive layer region 164 respectively which has been cut around the edge. In a preferred embodiment, the first strip stack layer 128 and the second strip stack layer 168 are adjacent to each other.

Figure 18:
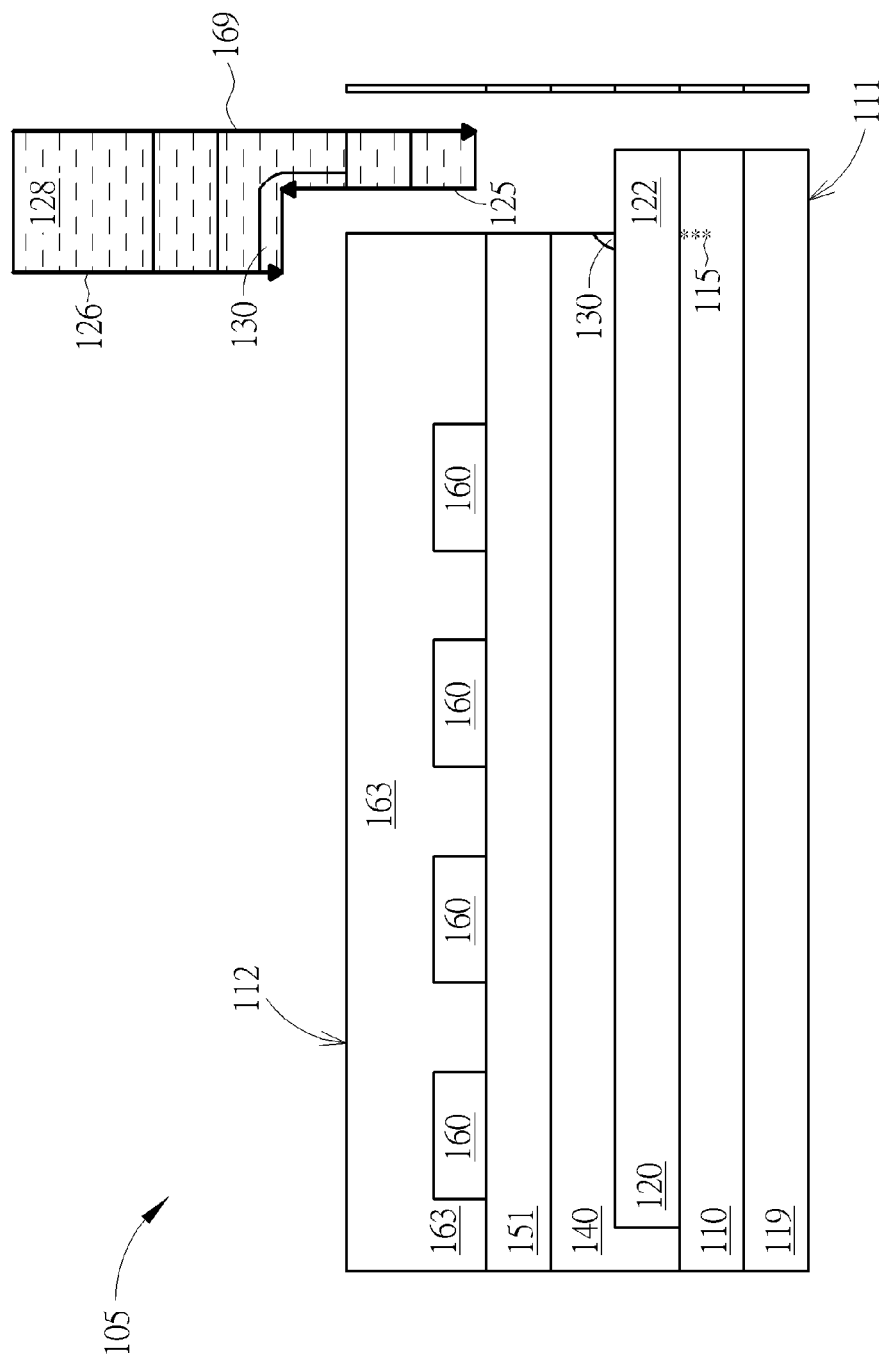
FIG. 18 is a schematic, cross-sectional diagram taken along line I-I' of FIG. 18A.
Figure 18A:
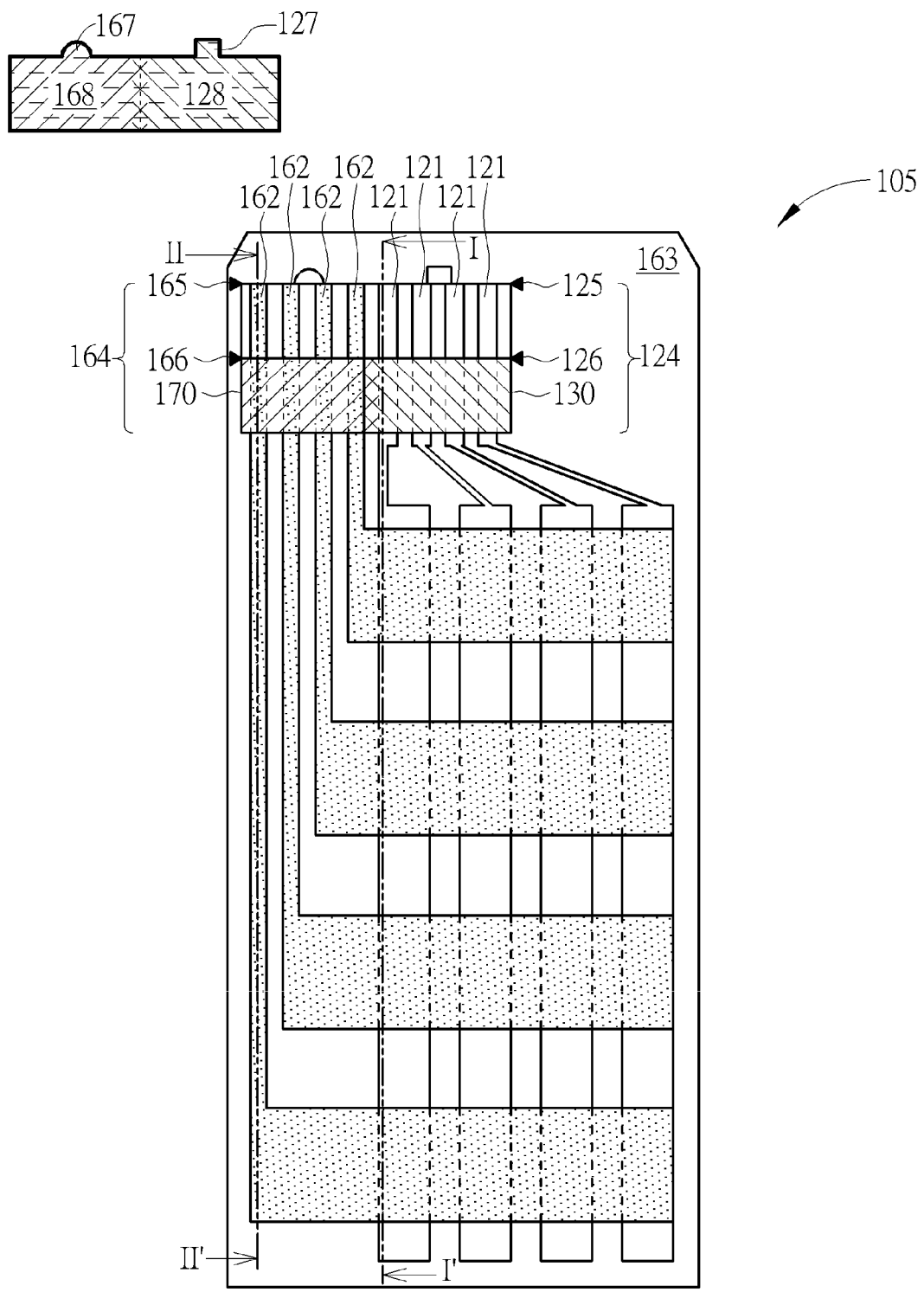
FIG. 18A and FIG. 19A are schematic plan views of the method of fabricating the touch film stack sheet from the semi-finished single sheet touch film stack according to the present invention.
Figure 18B:
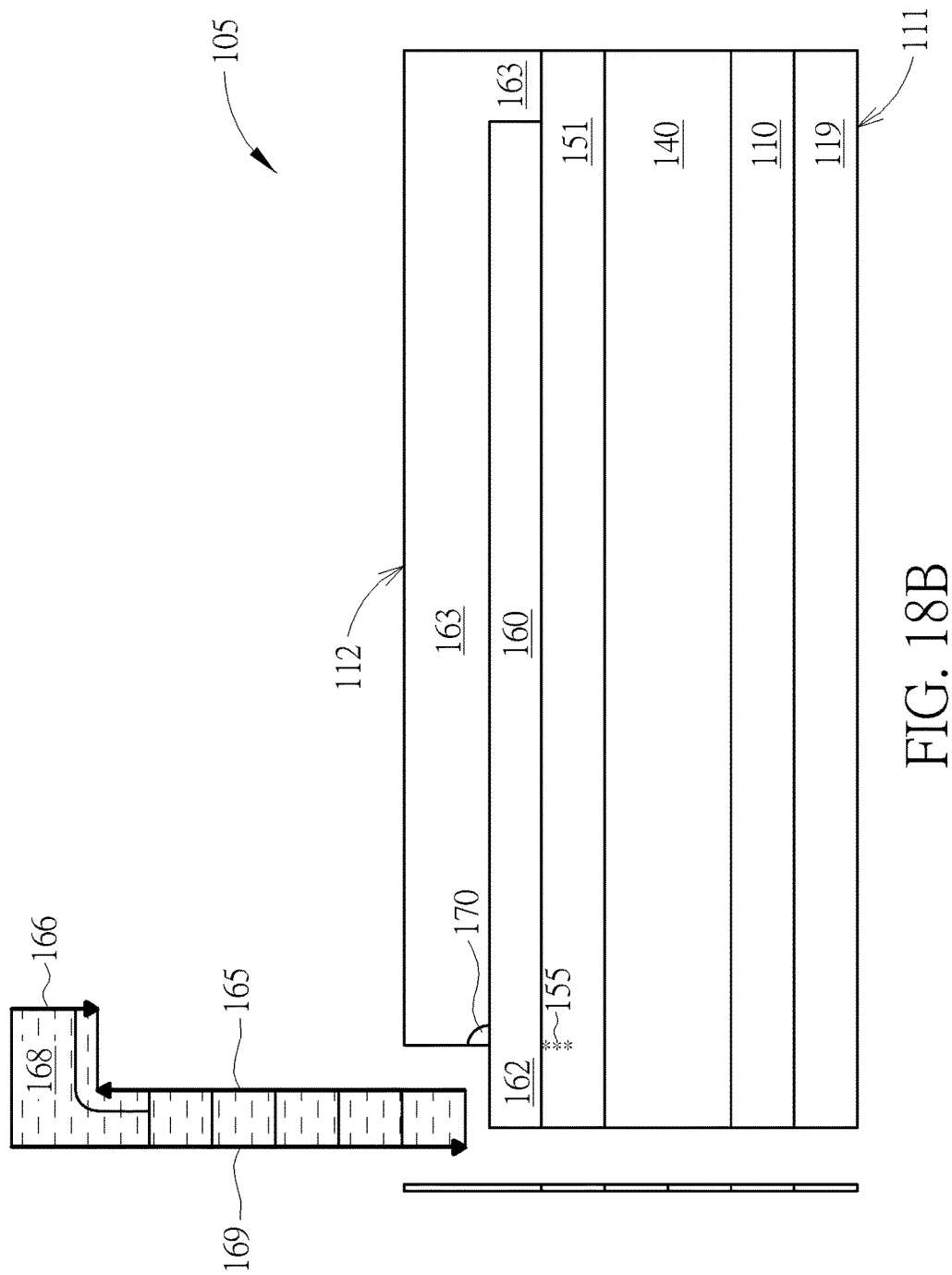
FIG. 18B is a schematic, cross-sectional diagram taken along line II-II' of FIG. 18A.

As shown in FIG. 18, FIG. 18A and FIG. 18B, a touch film stack sheet 107 is obtained from the single sheet of semi-finished touch film stack 105. For example, the first strip stack layer 128 and the second strip stack layer 168 are removed from the second surface 112 of the single sheet of semi-finished touch film stack 105, to expose the underneath bottom conductive terminals 122 and top conductive terminals 162. Because it is not necessary to cut along the outer edges of the top strip layer 170 and bottom strip layer 130, it is very possible to leave at least one of the residues of top strip layer 170 and bottom strip layer 13 on the single sheet of semi-finished touch film stack 105 after the first strip stack layer 128 and the second strip stack layer 168 are removed. The first strip stack layer 128 and the second strip stack layer 168 may be removed from the single sheet of semi-finished touch film stack 105 with bare hands. Preferably, the flap 127 and the flap 167 make it easier to remove the first strip stack layer 128 and the second strip stack layer 168 by fingers. In one embodiment of the invention, the second strip stack layer 168 with films stacks in shallower region may be removed together with the first strip stack layer 128 which has film stacks in deeper region. In another embodiment, the second strip stack layer 168 is removed individually followed by another step to remove the first strip stack layer 128.

Figure 19:
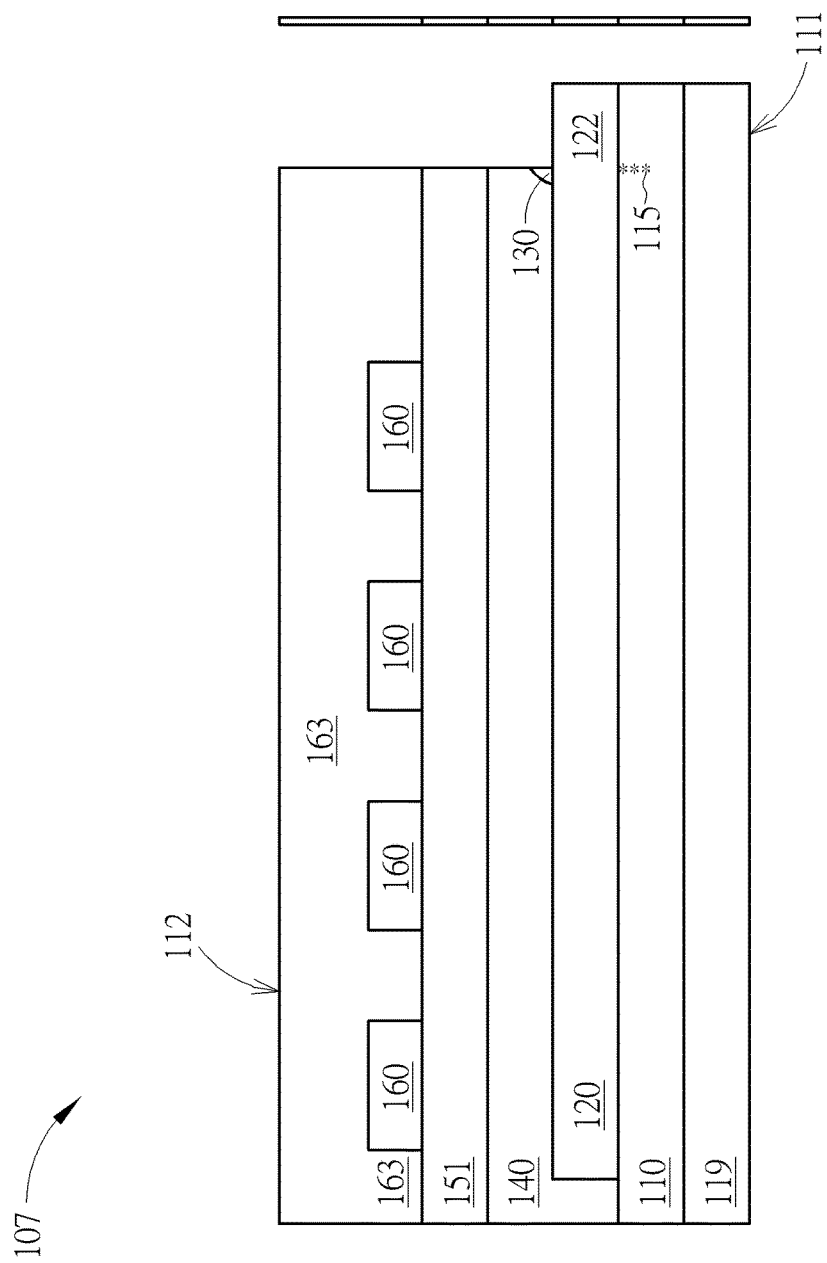
FIG. 19 is a schematic, cross-sectional diagram taken along line I-I' of FIG. 19A.
Figure 19A:
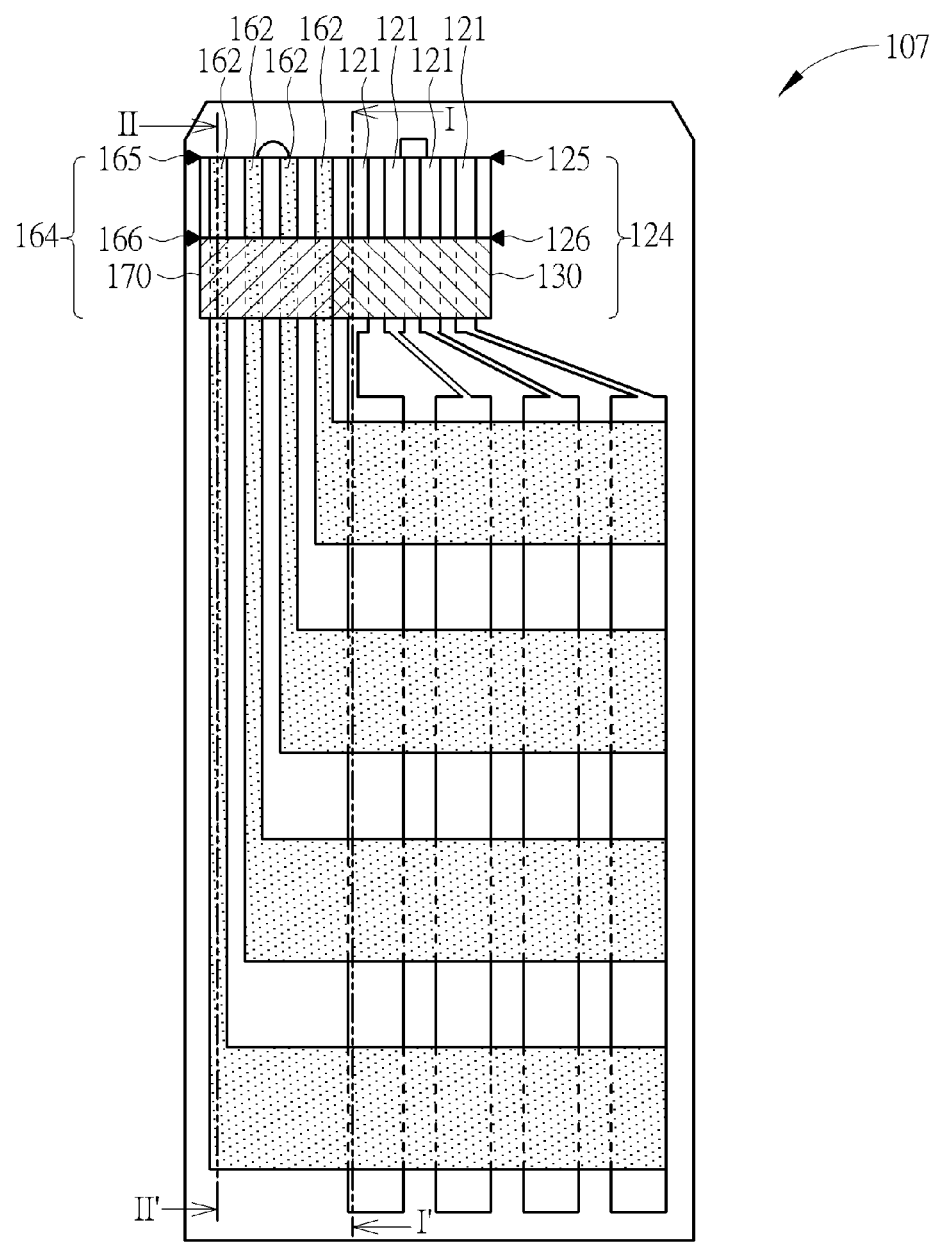
Figure 19B:
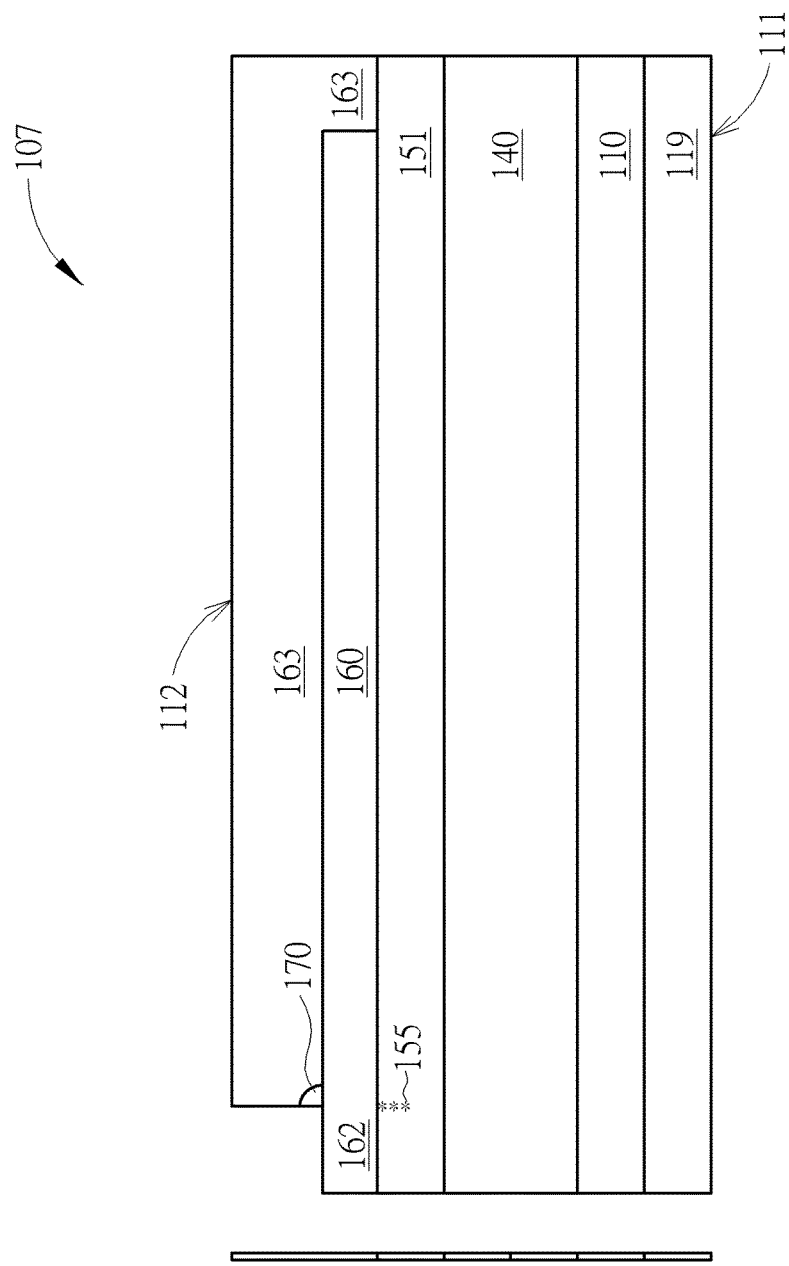
FIG. 19B is a schematic, cross-sectional diagram taken along line II-II' of FIG. 19A.

Please refer to FIG. 19, FIG. 19A and FIG. 19B, a finished touch film stack sheet 107 according to the present invention is obtained after the first strip stack layer 128 and the second strip stack layer 168 are removed. The bottom conductive terminals 122 and the top conductive terminals 162 of the touch film stack sheet 107 are exposed to be electrically connected to the circuit board (not shown) in later process. The touch film stack sheet 107 is obtained from manufacturing the touch film stack roll 103 or the semi-finished touch film stack 105 according to this invention, followed by removing the first strip stack layer 128 and the second strip stack layer 168 to expose the bottom conductive terminals 122 and the top conductive terminals 162. One of the features of the touch film stack sheet 107 is that it comprises at least one of the bottom strip layer 130 and the top strip layer 170 in the film stack. The residues of the bottom strip layers 130 and the top strip layer 170 may be seen by naked eyes especially when at least one of them is colored. Another feature of the touch film stack sheet 107 is that the cut marks resulting from partially cutting the touch film stack roll 103 are formed in the film stack of the touch film stack sheet 107. For example, the cut mark 115 is in the bottom substrate 110 and the cut mark 155 is in the top substrate 151. The layers of the touch film stack sheet 107 are illustrated previously in the specification.

The present invention provides a method of manufacturing a touch film stack sheet which has the advantages as described below. First, the composite layer roll and the top material layer roll are made in continuous roll-to-roll production mode. Second, the conductive layer on the substrate of the film stack is continuously patterned through the whole role. Third, the strip layer is continuously applied onto the whole roll. Moreover, the optically clear adhesive and the second film stack are adhered to the film stack in a roll-to roll production mode. Lastly, the continuously cutting, sawing and stripping steps are performed sequentially on the whole role to obtain the finished single touch film stack sheet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for forming a touch film stack roll, comprising:
providing a composite layer in a roll comprising a bottom substrate, a patterned bottom conductive layer, a bottom strip layer;
unwinding a length of said composite layer from said roll;
adhering a top material layer from a roll onto the patterned bottom conductive layer of the composite layer, the top material layer covering the bottom strip layer, wherein the top material layer comprises a top conductive layer;
patterning the top conductive layer of the top material layer thereby forming a patterned top conductive layer;
forming a top strip layer on the patterned top conductive layer of the top material layer; and
adhering a top optically clear adhesive entirely onto the patterned top conductive layer of the top material layer, the top optically clear adhesive covering the top strip layer, thereby forming a touch film stack; and
rolling the touch film stack into a roll to form the touch film stack roll.

2. The method according to claim 1 further comprising:
providing a pre-composite layer comprising a bottom substrate and a bottom conductive layer;
patterning the bottom conductive layer of the pre-composite layer to form the patterned bottom conductive layer;
applying a bottom strip layer liquid onto the patterned bottom conductive layer of the pre-composite layer; and
curing the bottom strip layer liquid thereby forming the composite layer.

3. The method according to claim 1 further comprising:
adhering a top conductive layer onto a bottom optically clear adhesive thereby forming the top material layer.

4. The method according to claim 1 further comprising:
adhering a bottom optically clear adhesive onto the composite layer; and
adhering the top material layer to the composite layer with the bottom optically clear adhesive.

5. The method according to claim 1, wherein the top conductive layer is patterned by block-type exposing the top material layer that aligns with the patterned bottom conductive layer.

6. The method according to claim 5, wherein there is substantially no misalignment between the patterned bottom conductive layer and the patterned top conductive layer.

7. The method according to claim 1, wherein forming the top strip layer on the patterned top conductive layer of the top material layer further comprises:
applying a top strip layer liquid onto the patterned top conductive layer; and
curing the top strip layer liquid thereby forming the top strip layer.

8. The method according to claim 1 further comprising:
cutting the touch film stack from a first surface of the touch film stack, wherein the touch film stack is not cut through when cutting the touch film stack from the first surface; and
cutting the touch film stack from a second surface of the touch film stack thereby forming a semi-finished touch film stack, wherein a portion of the touch film stack is cut through and a portion of the touch film stack is not cut through when cutting the touch film stack from the second surface of the touch film stack.

9. The method according to claim 8, wherein cutting the touch film stack from the first surface and the second surface of the touch film stack forms a first strip stack layer and a second strip stack layer in the semi-finished touch film stack.

10. The method according to claim 9 further comprising:
removing the first strip stack layer and the second strip stack layer from the second surface thereby exposing a first conductive terminal and a second conductive terminal.

11. The method according to claim 10, wherein one of the bottom strip layer and the top strip layer is remained when removing the first strip stack layer and the second strip stack layer.

12. The method according to claim 10, wherein the first strip stack layer and the second strip stack layer are removed simultaneously.

13. The method according to claim 10, wherein the first strip stack layer and the second strip stack layer are successively removed.

14. The method according to claim 10, wherein the first conductive terminal is electrically connected to the bottom conductive layer, and the second conductive terminal is electrically connected to the top conductive layer.

15. The method according to claim 10 further comprising:
obtaining a touch film stack sheet by removing the first strip stack layer and the second strip stack layer.

* * * * *